(12) United States Patent
Nishikawa et al.

(10) Patent No.: US 11,149,799 B2
(45) Date of Patent: Oct. 19, 2021

(54) POWER TRANSMISSION DEVICE

(71) Applicant: Kabushiki Kaisha F.C.C., Hamamatsu (JP)

(72) Inventors: Junichi Nishikawa, Hamamatsu (JP); Katsu Yoshimoto, Hamamatsu (JP); Han Hiong Chen, Hamamatsu (JP); Yoshihiko Ozawa, Hamamatsu (JP)

(73) Assignee: Kabushiki Kaisha F.C.C., Hamamatsu (JP)

( * ) Notice: Subject to any disclaimer, the term of this patent is extended or adjusted under 35 U.S.C. 154(b) by 0 days.

(21) Appl. No.: 16/925,794

(22) Filed: Jul. 10, 2020

(65) Prior Publication Data

US 2020/0340537 A1  Oct. 29, 2020

Related U.S. Application Data

(63) Continuation of application No. PCT/JP2019/000382, filed on Jan. 9, 2019.

(30) Foreign Application Priority Data

Jan. 11, 2018 (JP) .............................. JP2018-002703

(51) Int. Cl.
F16D 13/52 (2006.01)
F16D 23/12 (2006.01)

(52) U.S. Cl.
CPC ............. F16D 13/52 (2013.01); F16D 23/12 (2013.01); *F16D 2023/123* (2013.01)

(58) Field of Classification Search
CPC .......... F16D 13/52; F16D 13/56; F16D 23/12; F16D 2013/565; F16D 43/21; F16D 2023/123
See application file for complete search history.

(56) References Cited

U.S. PATENT DOCUMENTS

| 2014/0326570 | A1* | 11/2014 | Isobe | ..................... F16D 13/56 192/70.11 |
| 2014/0353108 | A1* | 12/2014 | Tokumoto | ............... F16D 13/56 192/66.31 |

(Continued)

FOREIGN PATENT DOCUMENTS

| JP | 8-093786 | 4/1996 |
| JP | 2007-024134 A | 2/2007 |

(Continued)

OTHER PUBLICATIONS

International Search Report dated Apr. 9, 2019 in corresponding PCT Application No. PCT/JP2019/000382.

*Primary Examiner* — Ernesto A Suarez
*Assistant Examiner* — Lillian T Nguyen
(74) *Attorney, Agent, or Firm* — Harness, Dickey & Pierce, P.L.C.

(57) ABSTRACT

A power transmission device has a pressure member (5) pressing drive-side clutch plates and driven-side clutch plates against each other or releasing a press-contact force. A clutch spring (10) urges the pressure member (5) in a direction so that the clutch plates are pressed against each other. A separate receiving member (11) is attached to the pressure member (5). A back-torque limiting cam reduces press-contact force between the clutch plates when the rotation speed of an output member exceeds the rotation speed of an input member. A rotation restricting portion (8a) restricting rotation, relative to the clutch member (4), of the pressure member (5) that has moved due to activation of the push rod (9). A clearance t is maintained between the pair of cam surfaces that constitute the back-torque limiting cam.

2 Claims, 27 Drawing Sheets

(56) References Cited

U.S. PATENT DOCUMENTS

| | | | |
|---|---|---|---|
| 2016/0332636 A1* | 11/2016 | Iida | B60W 10/11 |
| 2017/0184156 A1* | 6/2017 | Kataoka | F16D 13/52 |
| 2019/0211886 A1* | 7/2019 | Ito | F16D 13/70 |

FOREIGN PATENT DOCUMENTS

| | | |
|---|---|---|
| JP | 2013-194795 A | 9/2013 |
| WO | WO-2016/024557 A1 | 2/2016 |

\* cited by examiner

[Fig. 1]
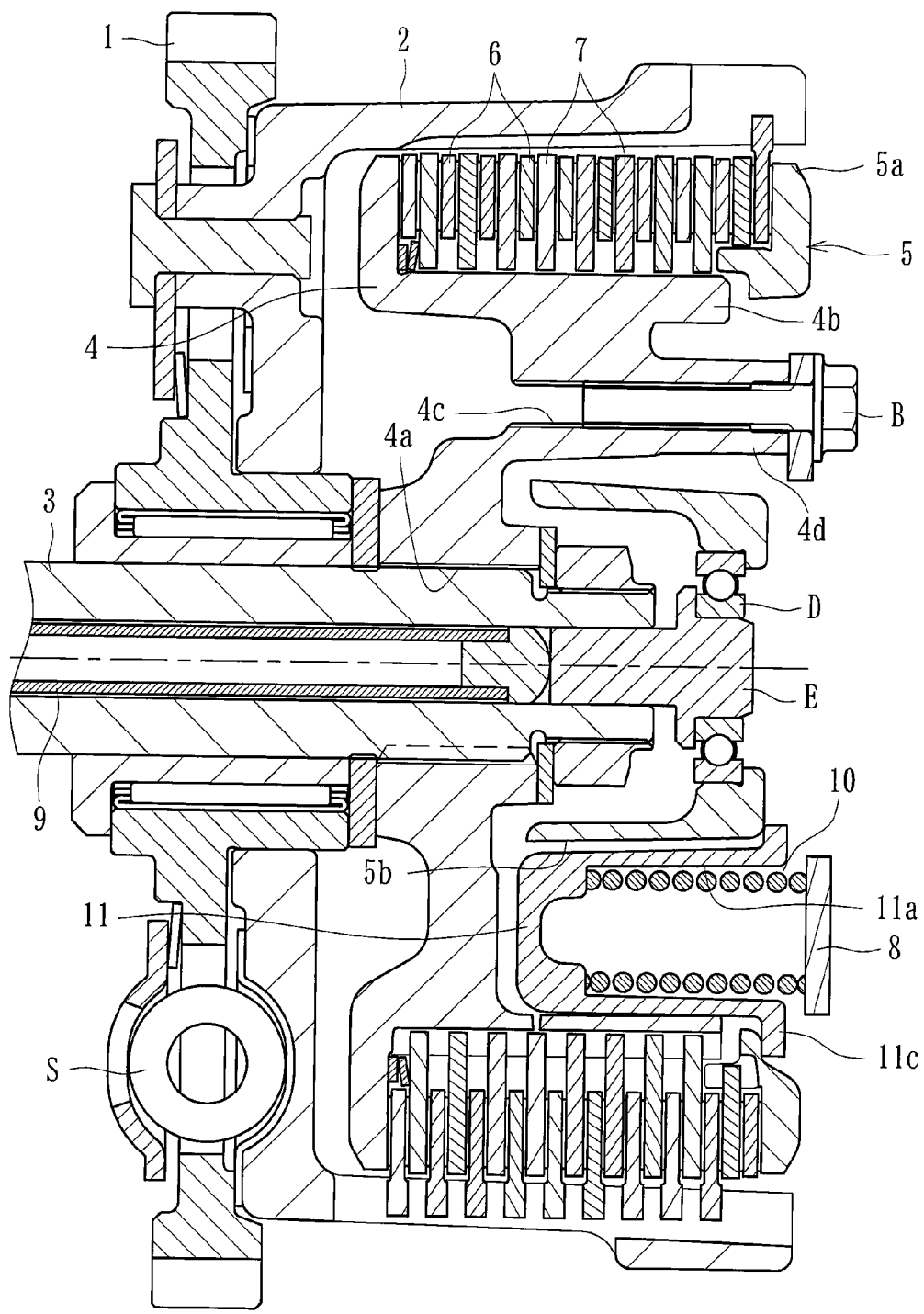

[Fig. 2]
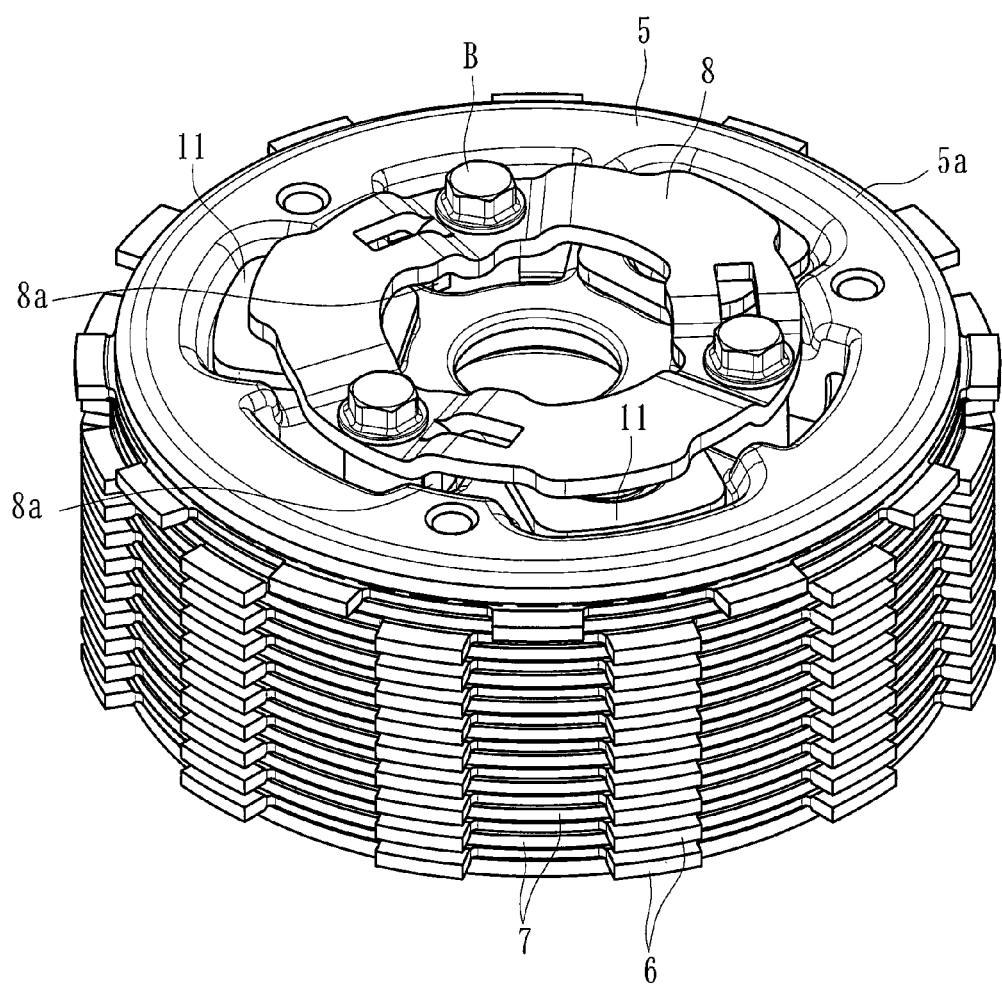

[Fig. 3]
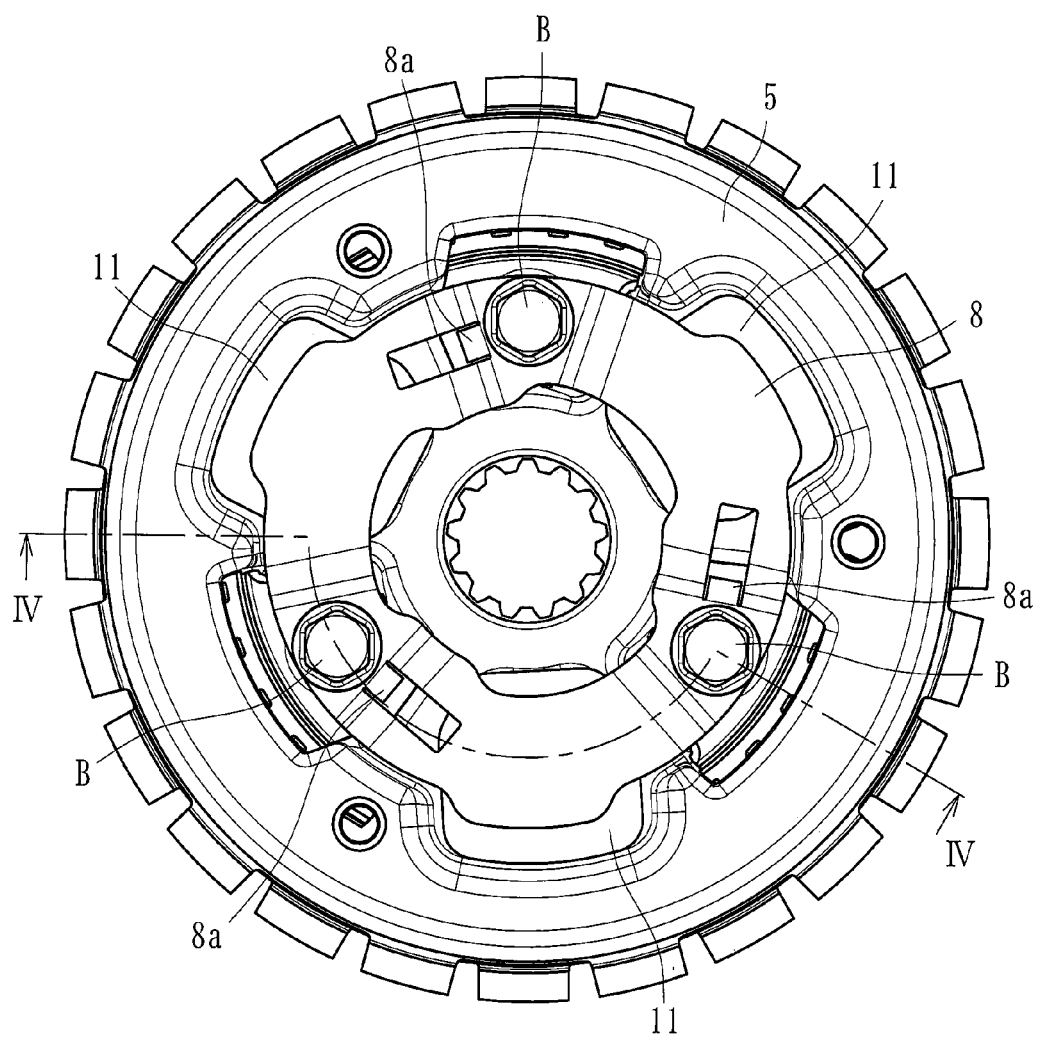

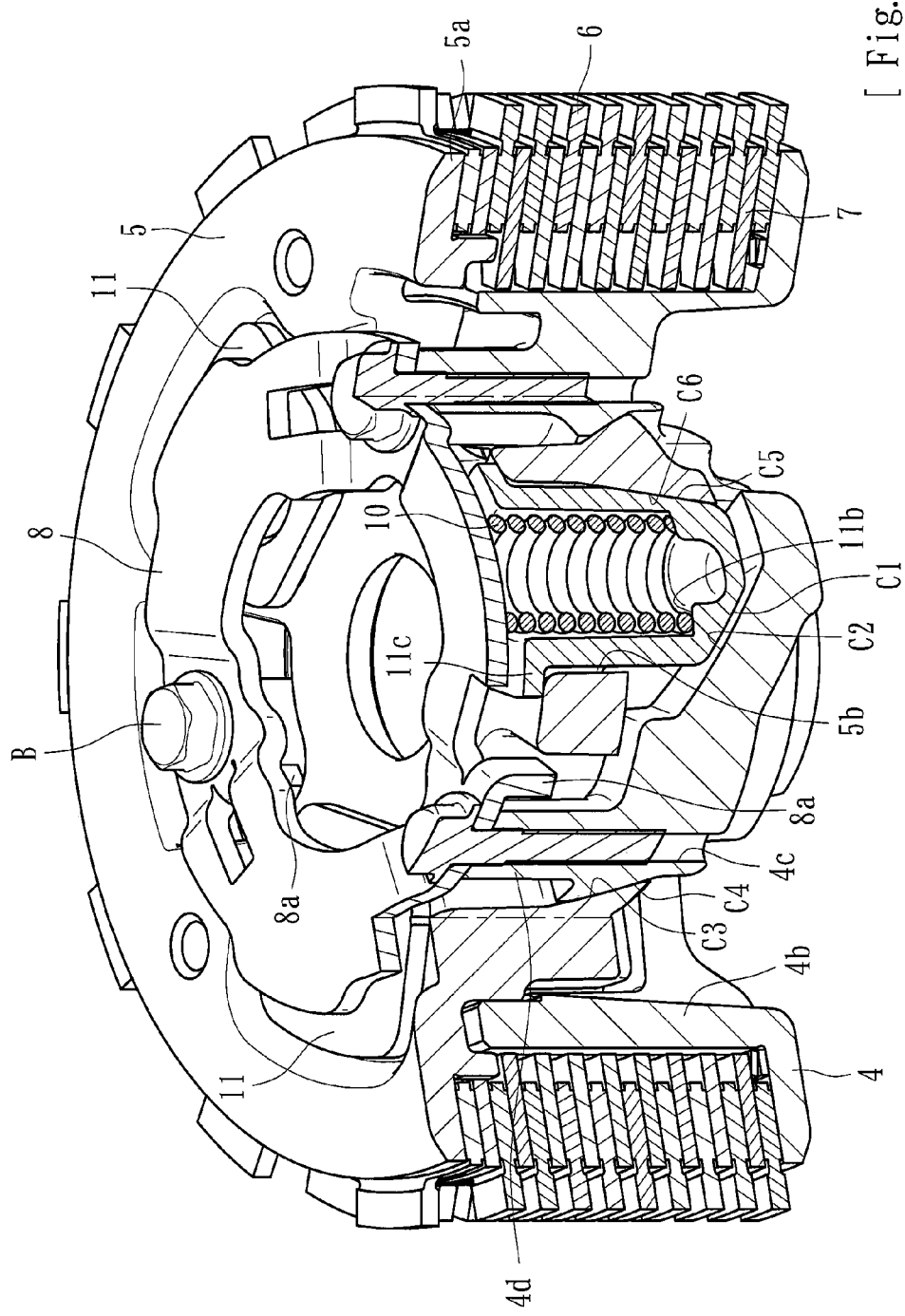
[Fig. 4]

[Fig. 5]
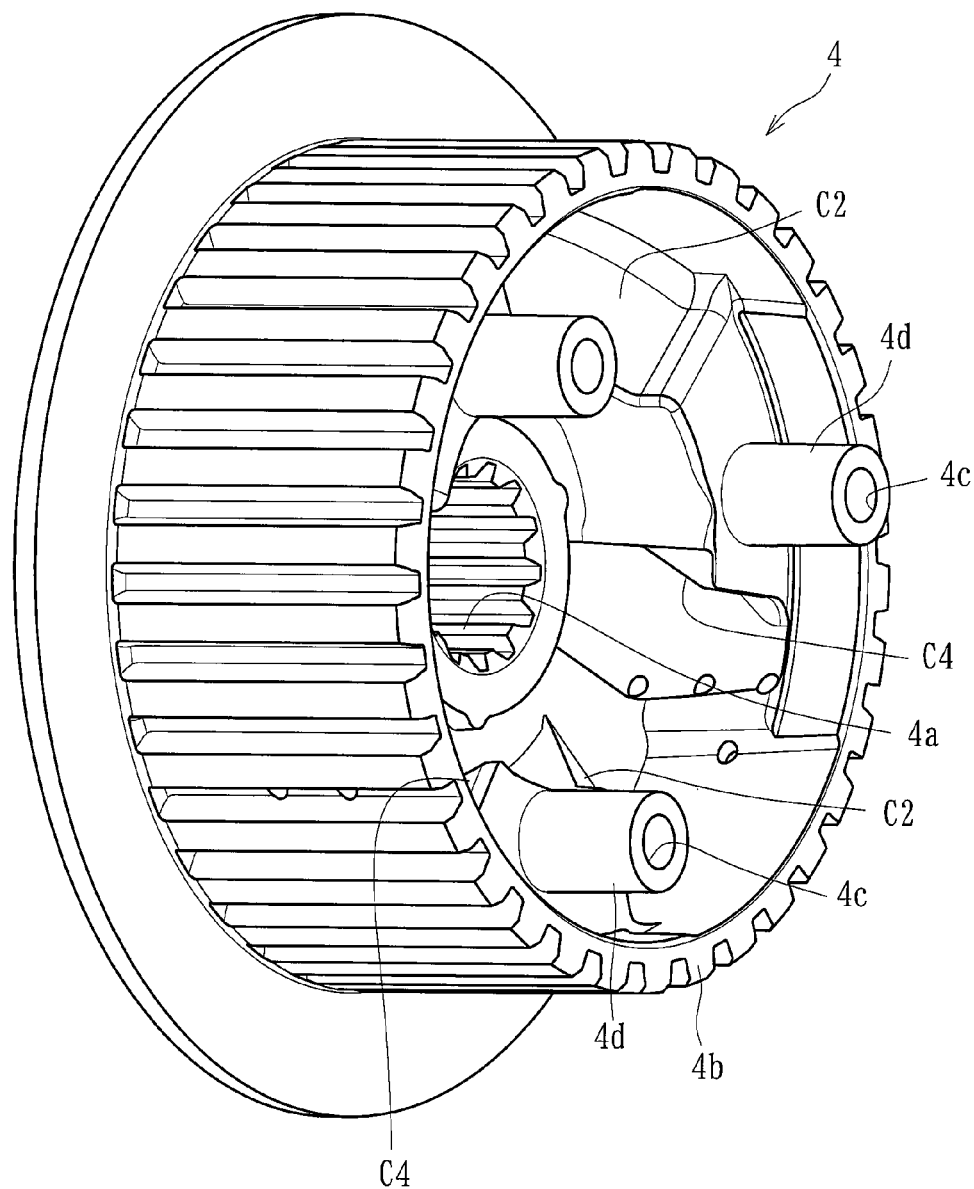

[Fig. 6]
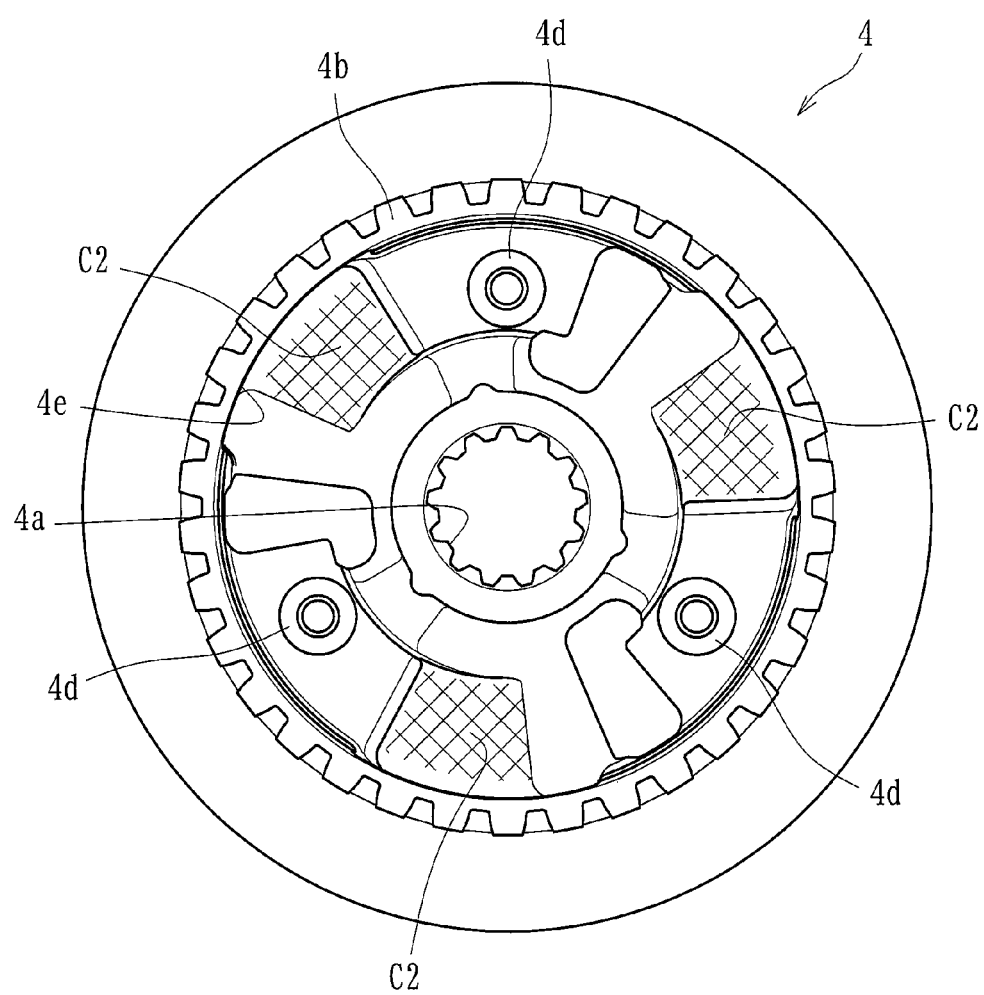

[Fig. 7]
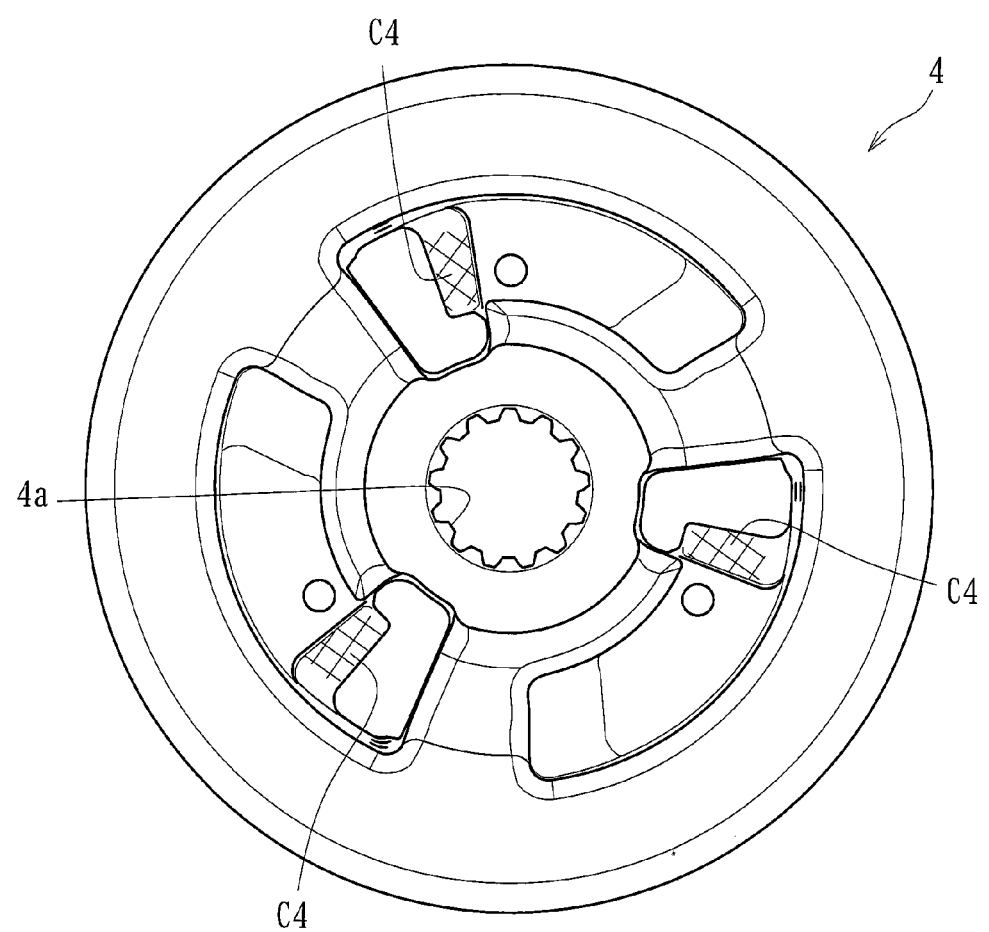

[Fig. 8]
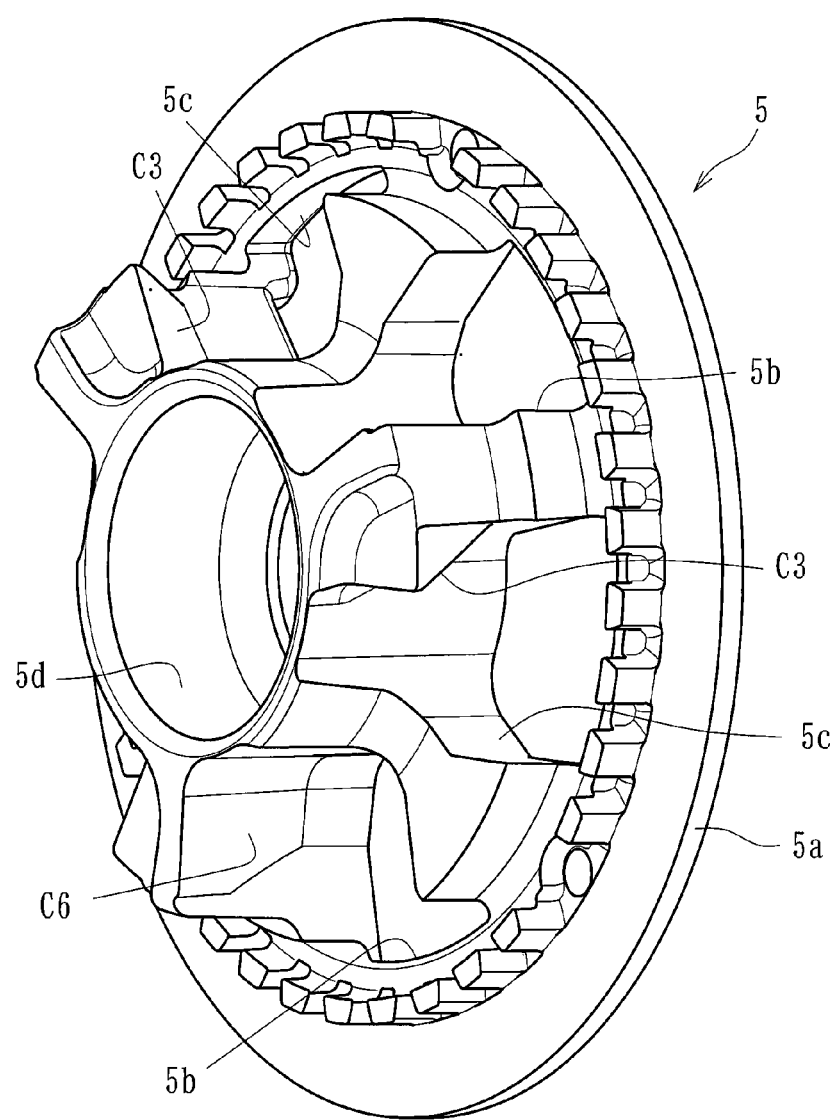

[Fig. 9]
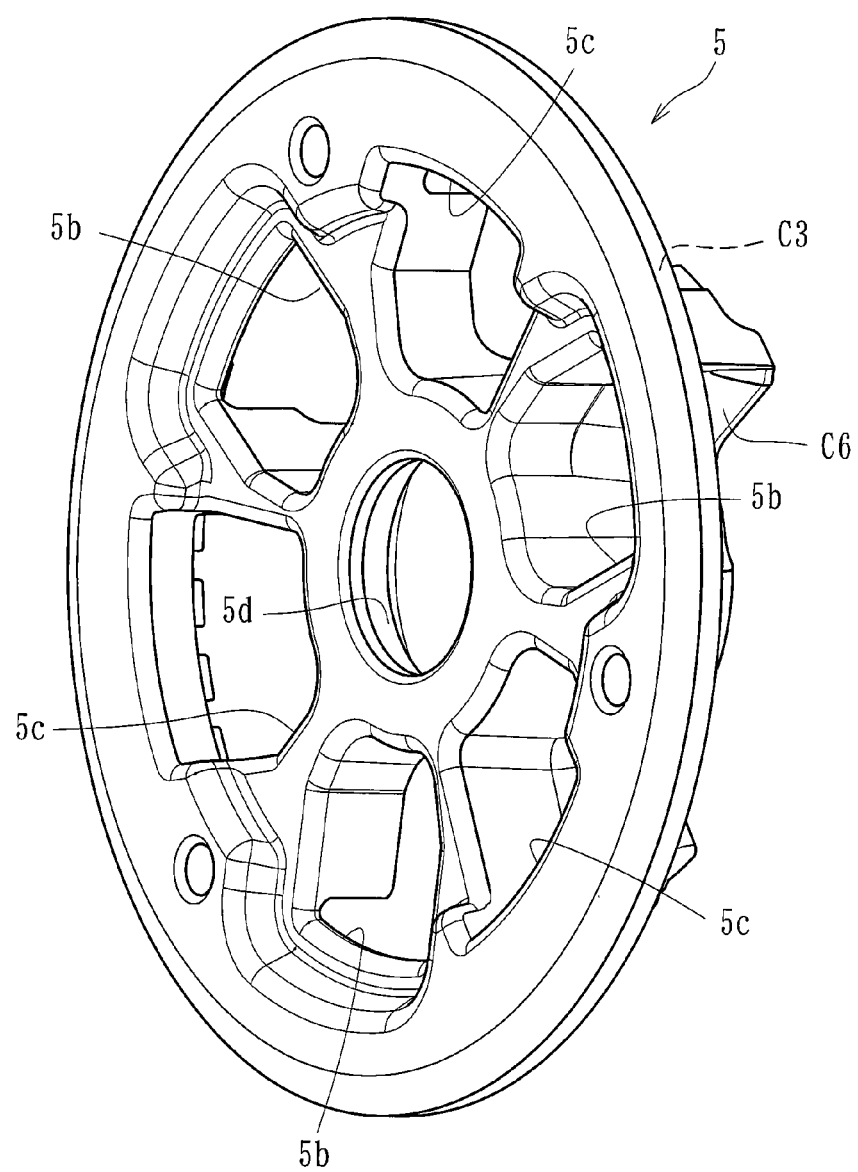

[ Fig. 10 ]
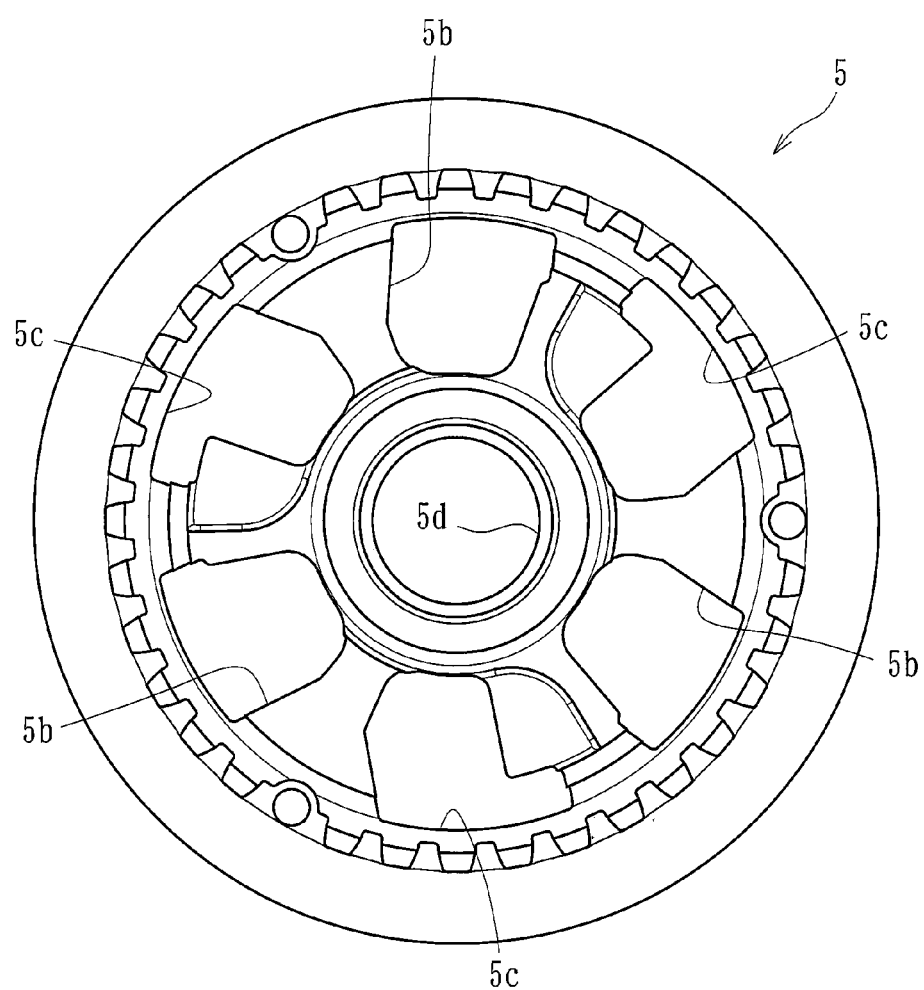

[ Fig. 11 ]
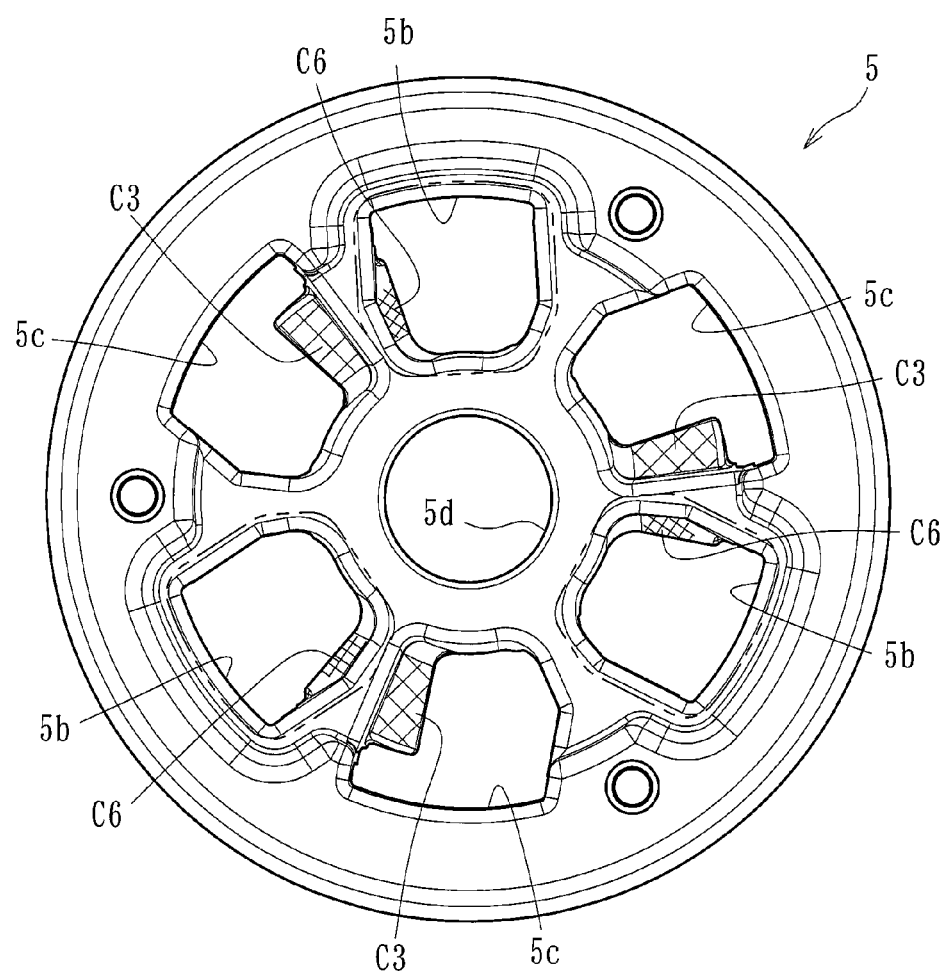

[Fig. 12]
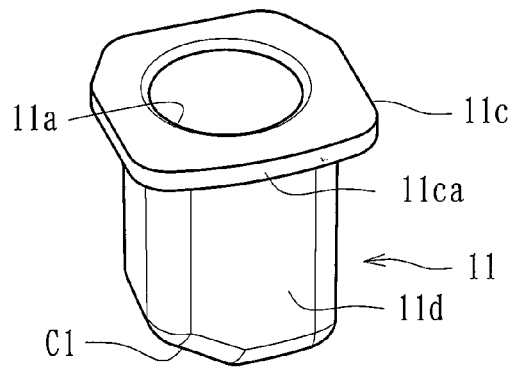
[Fig. 13]
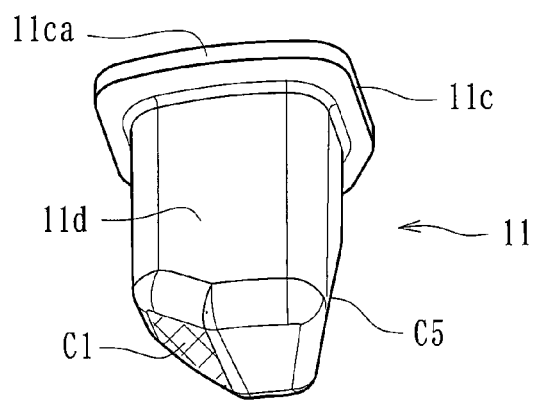
[Fig. 14]
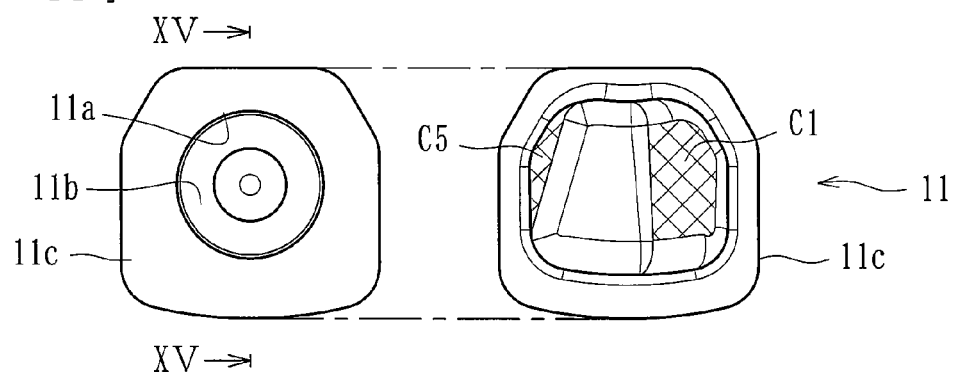
[Fig. 15]
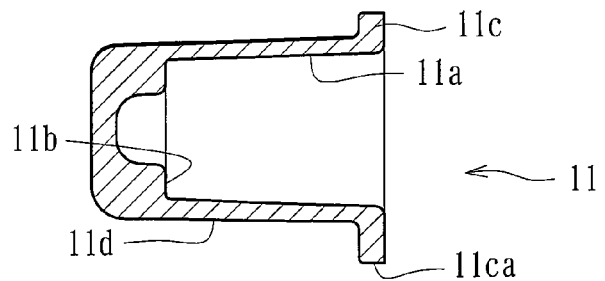

[ Fig. 16 ]
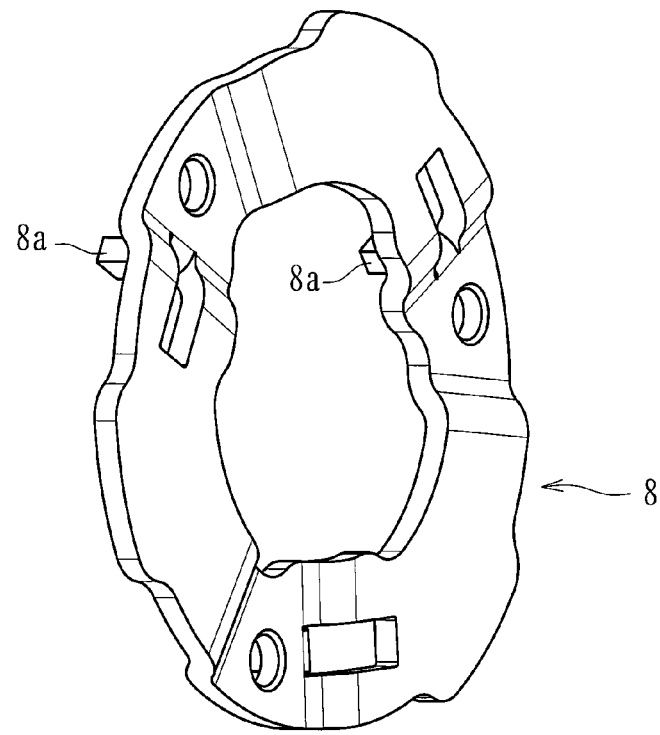
[ Fig. 17 ]
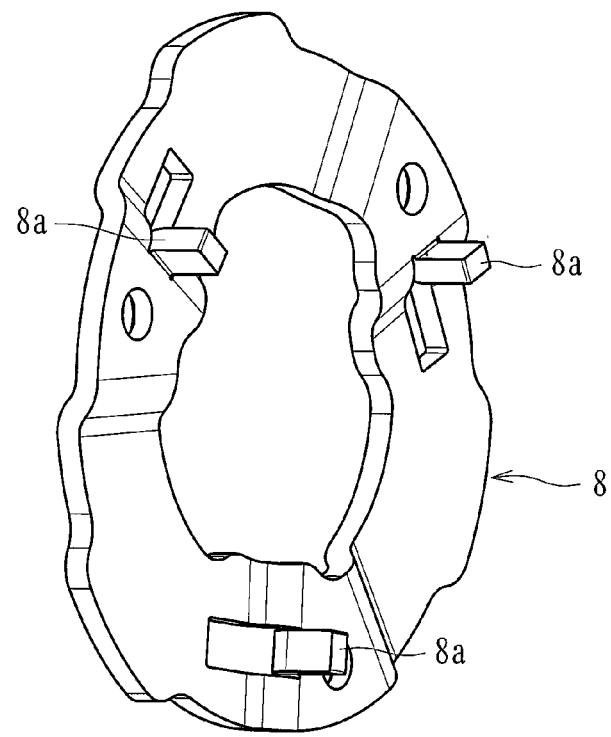

[Fig. 18]
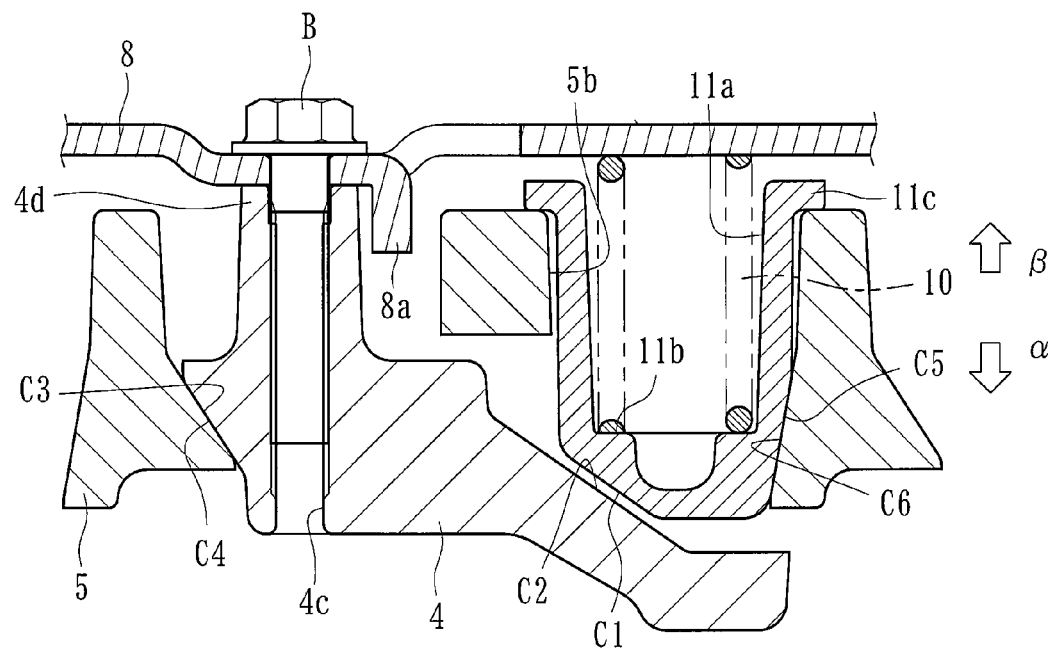
[Fig. 19]
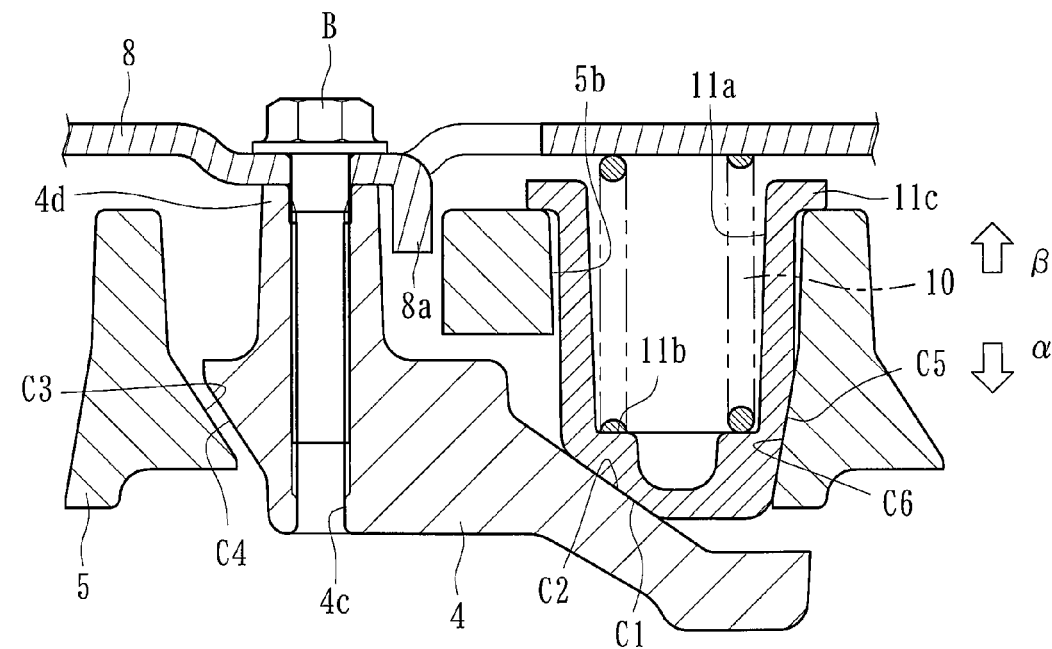

[Fig. 20]
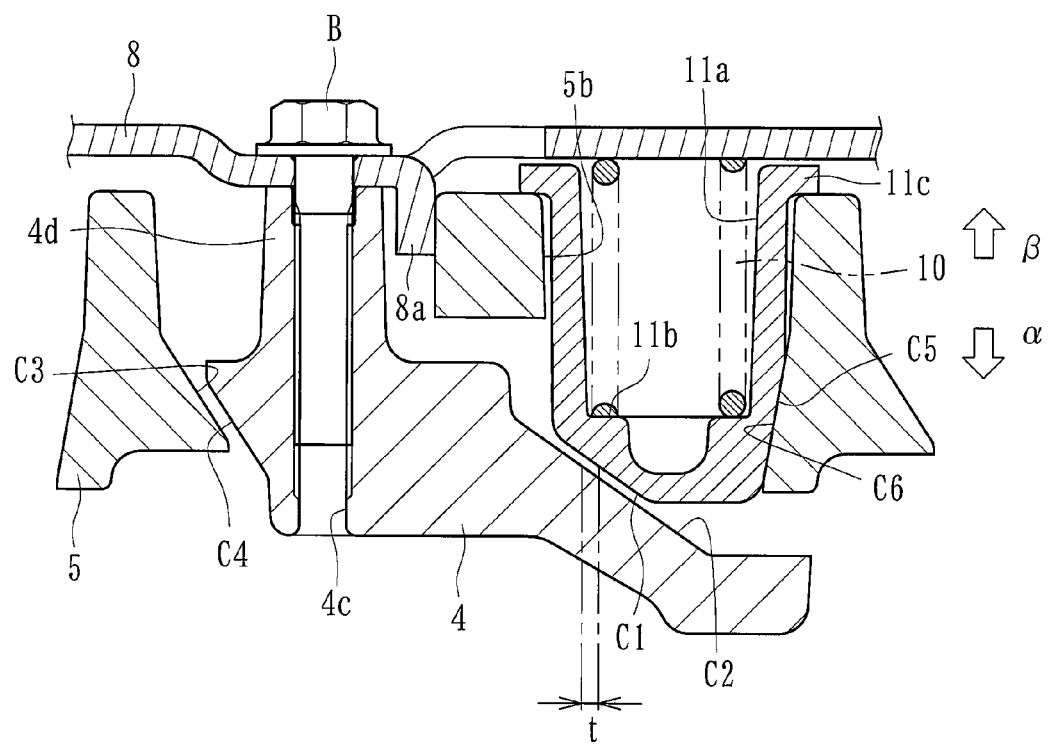

[Fig. 21]
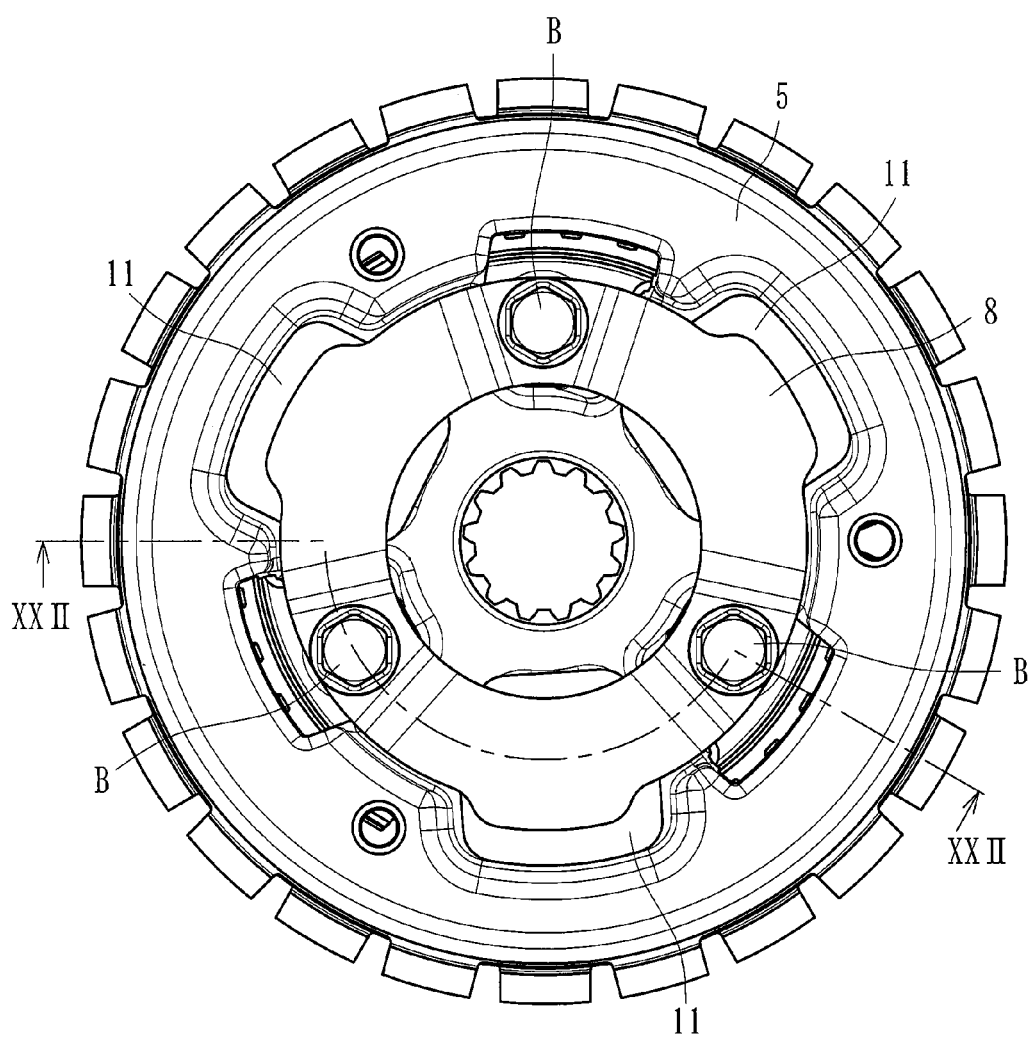

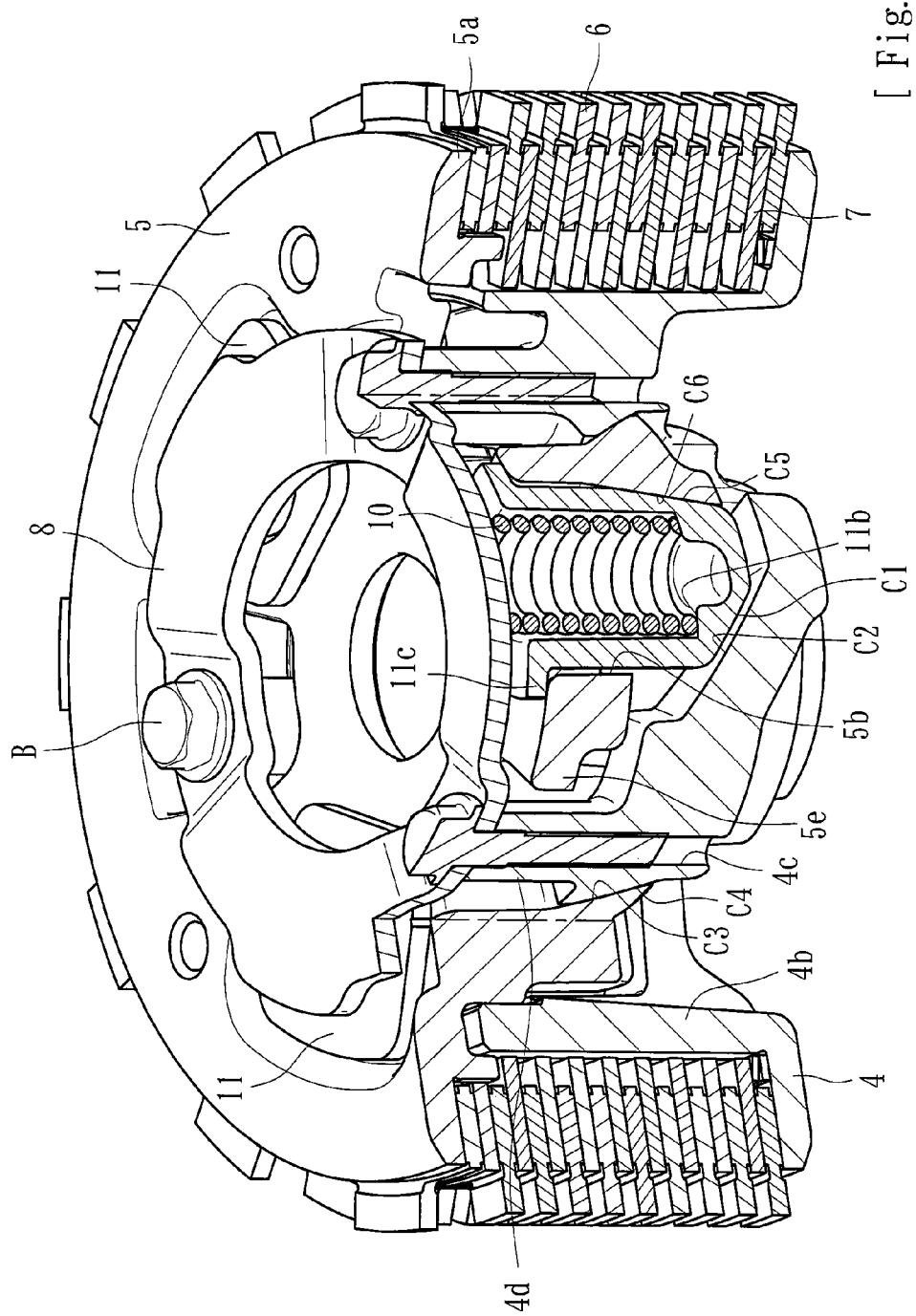
[ Fig. 22 ]

[ Fig. 23 ]
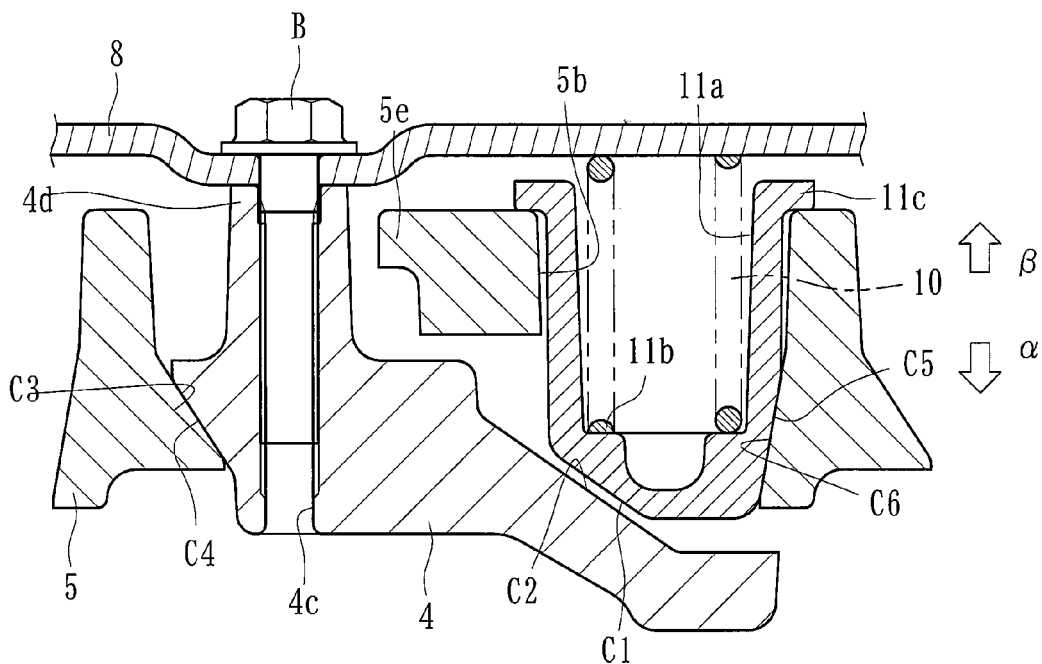
[ Fig. 24 ]
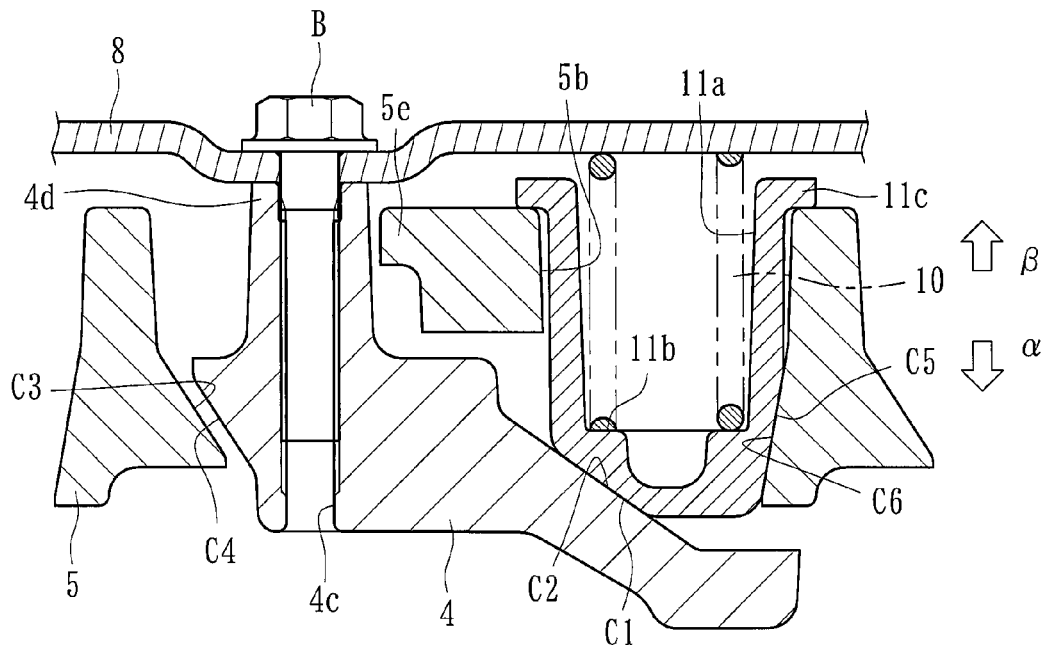

[Fig. 25]
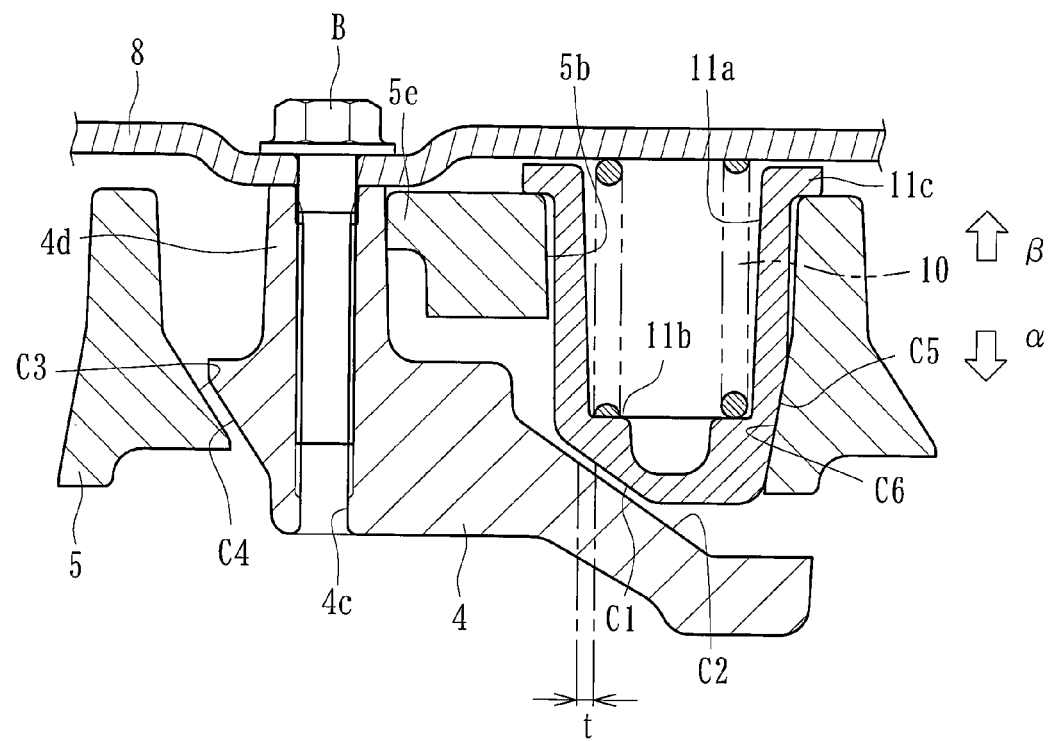

[Fig. 26]
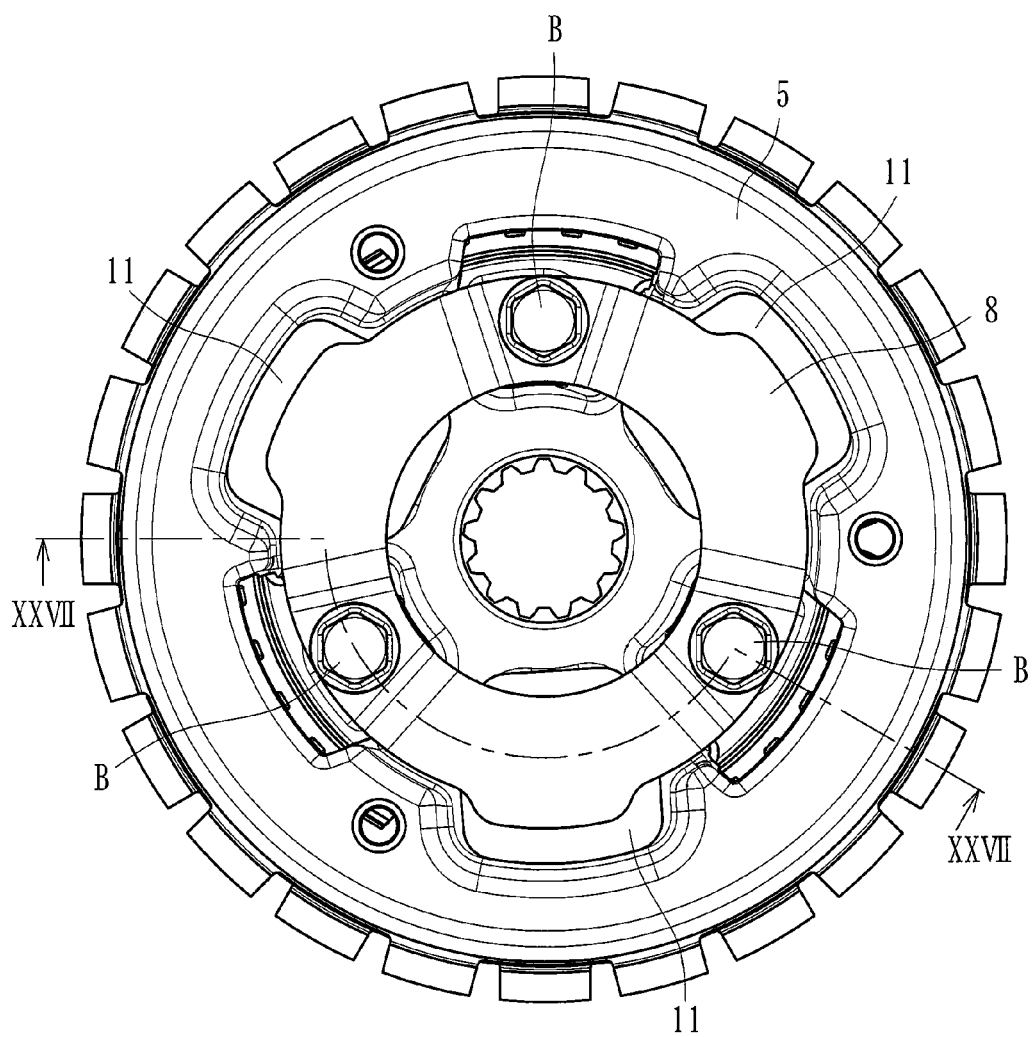

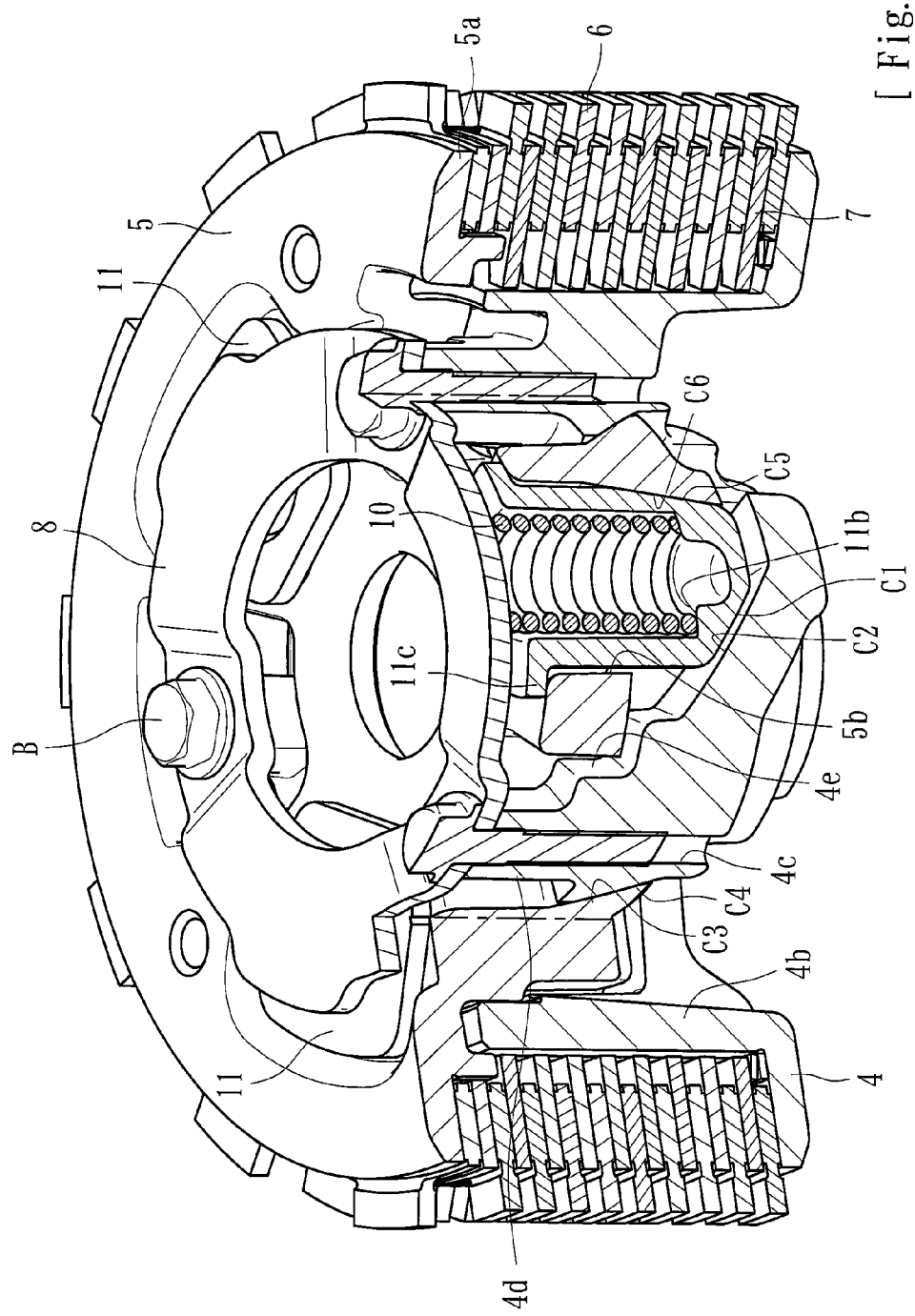
[ Fig. 27 ]

[Fig. 28]
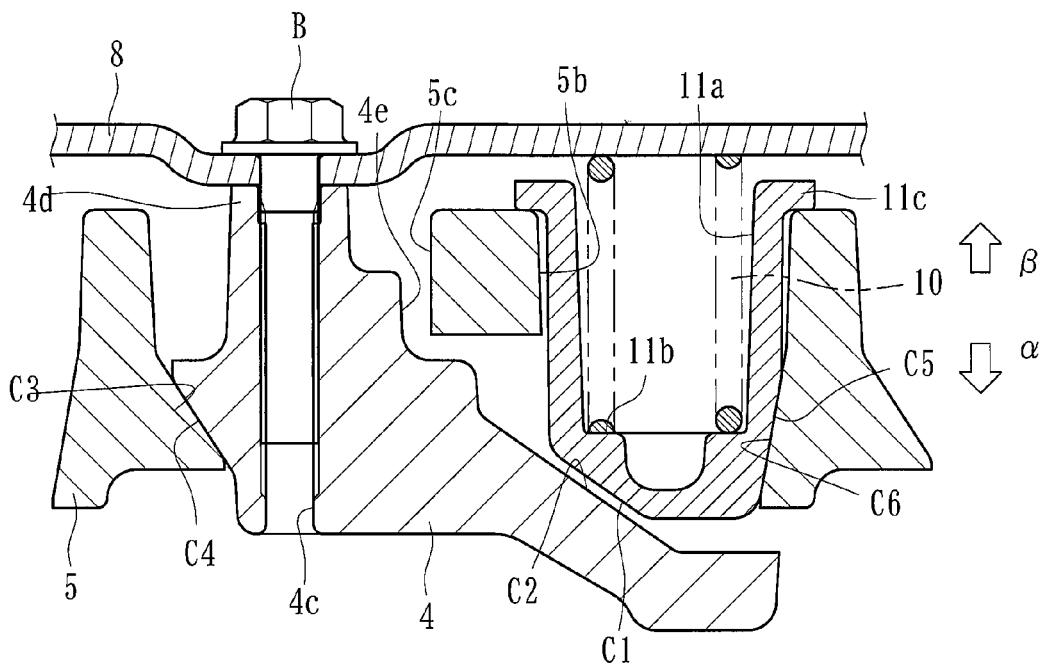
[Fig. 29]
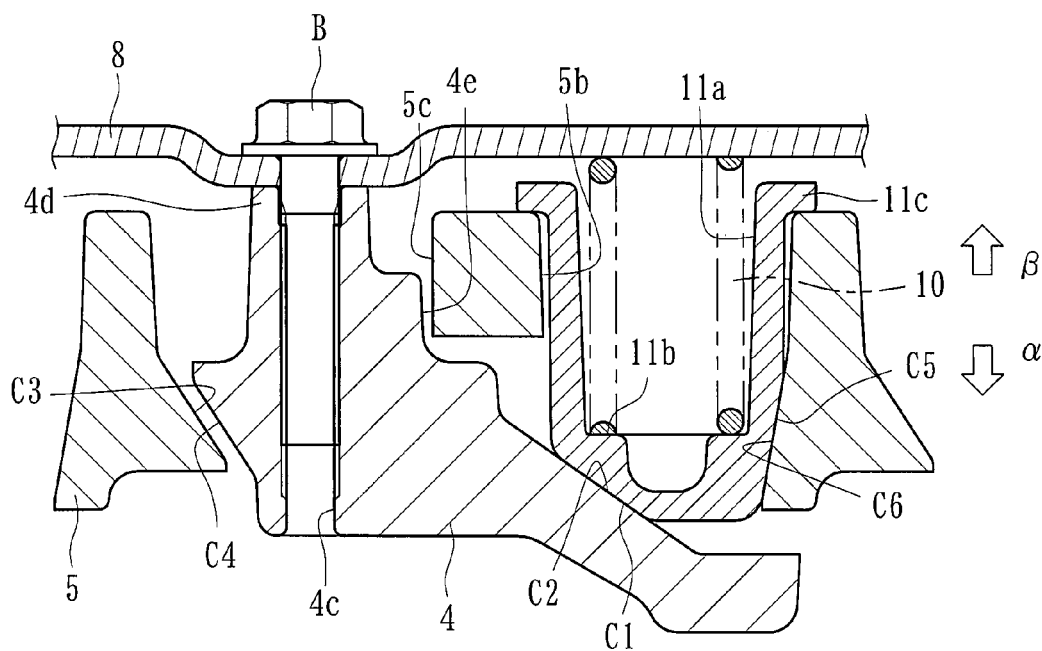

[Fig. 30]
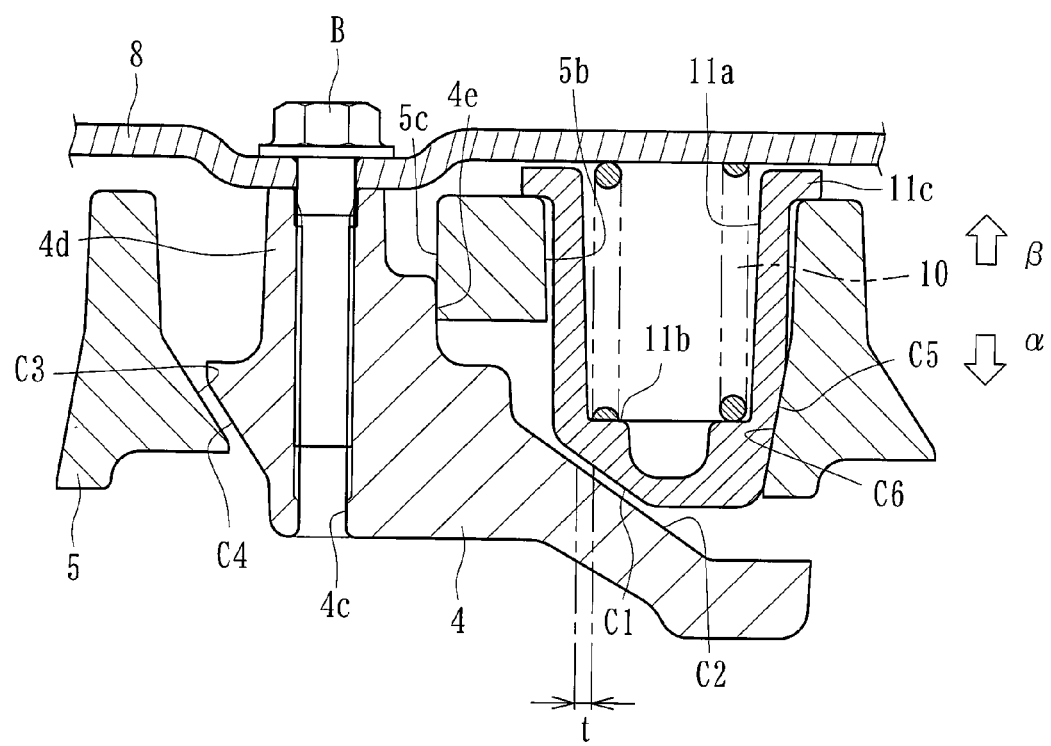

[ Fig. 31 ]
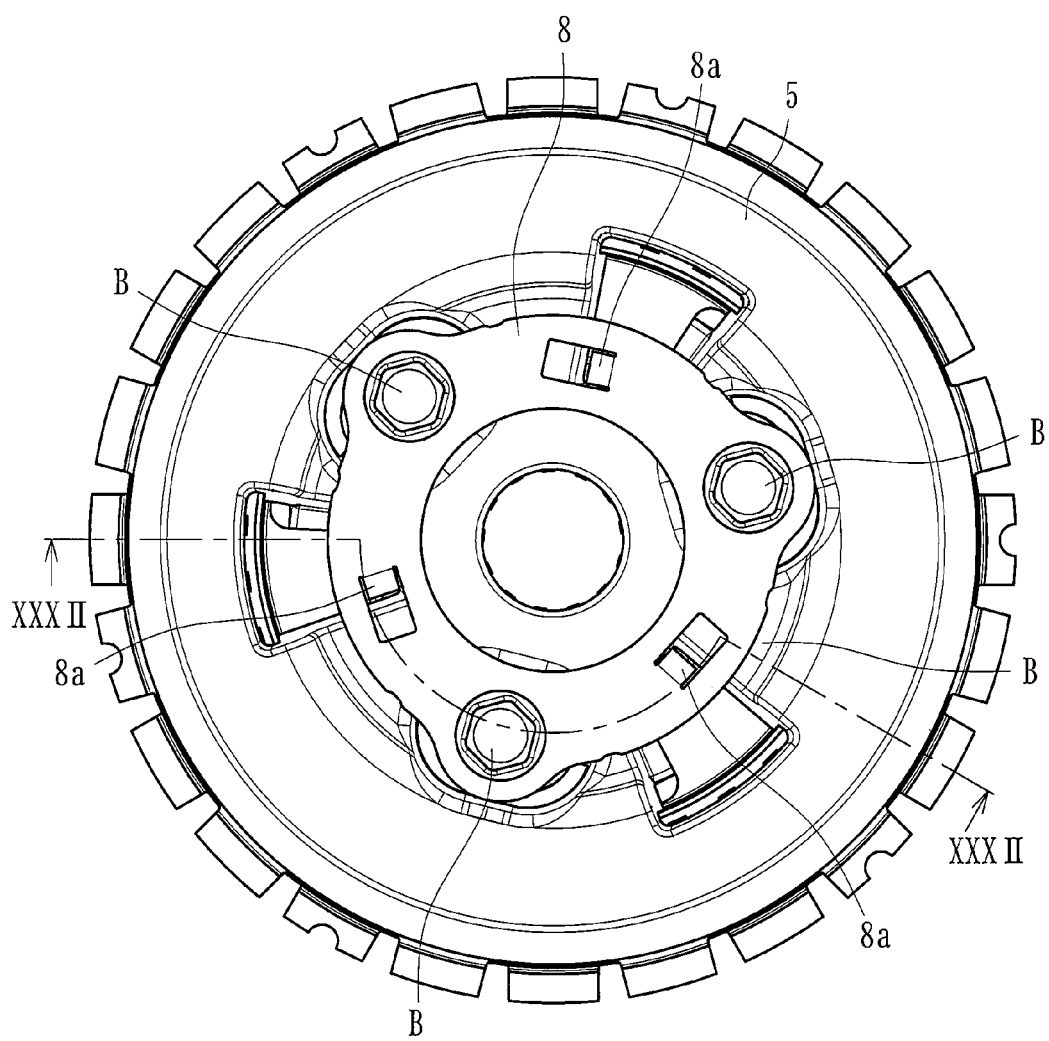

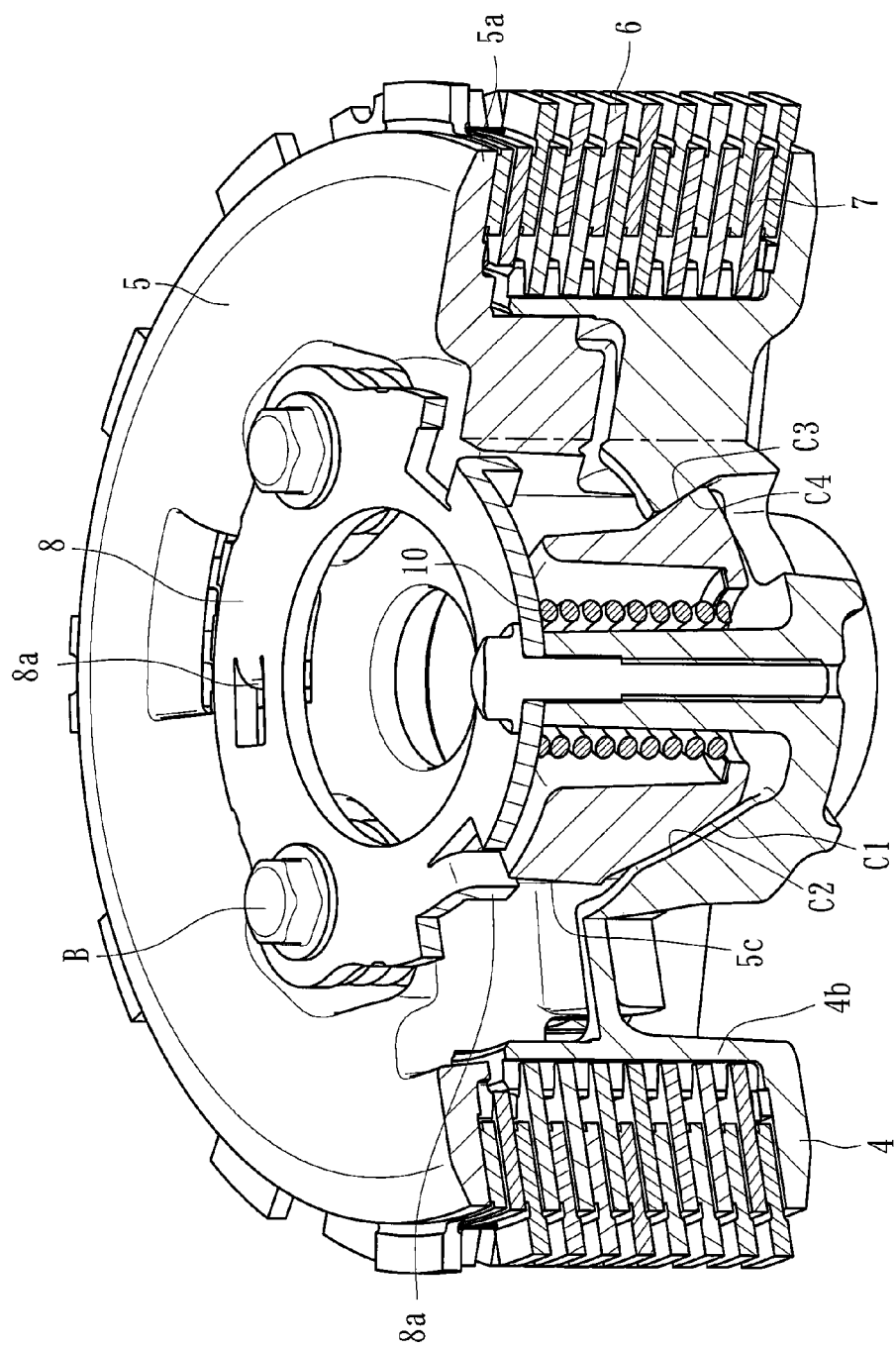
[Fig. 32]

[Fig. 33]
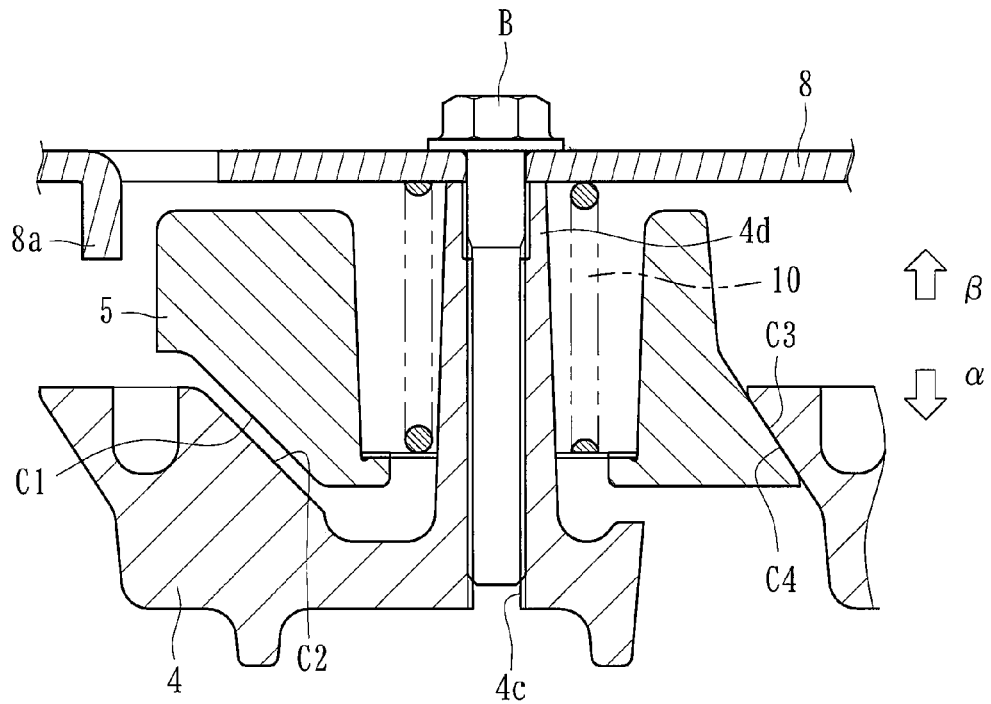
[Fig. 34]
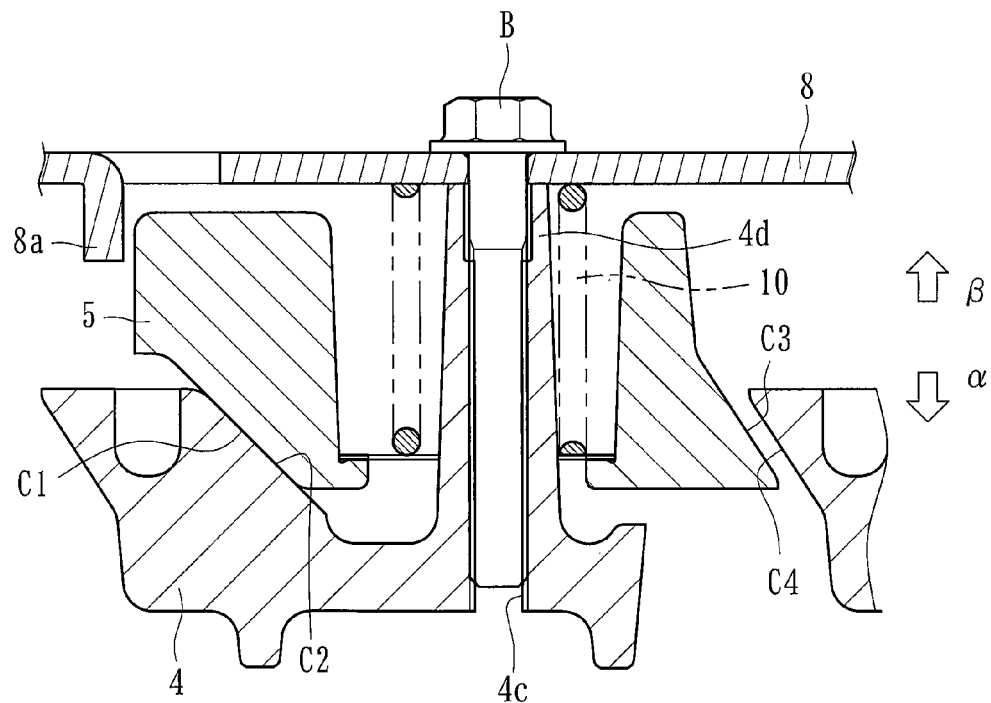

[Fig. 35]
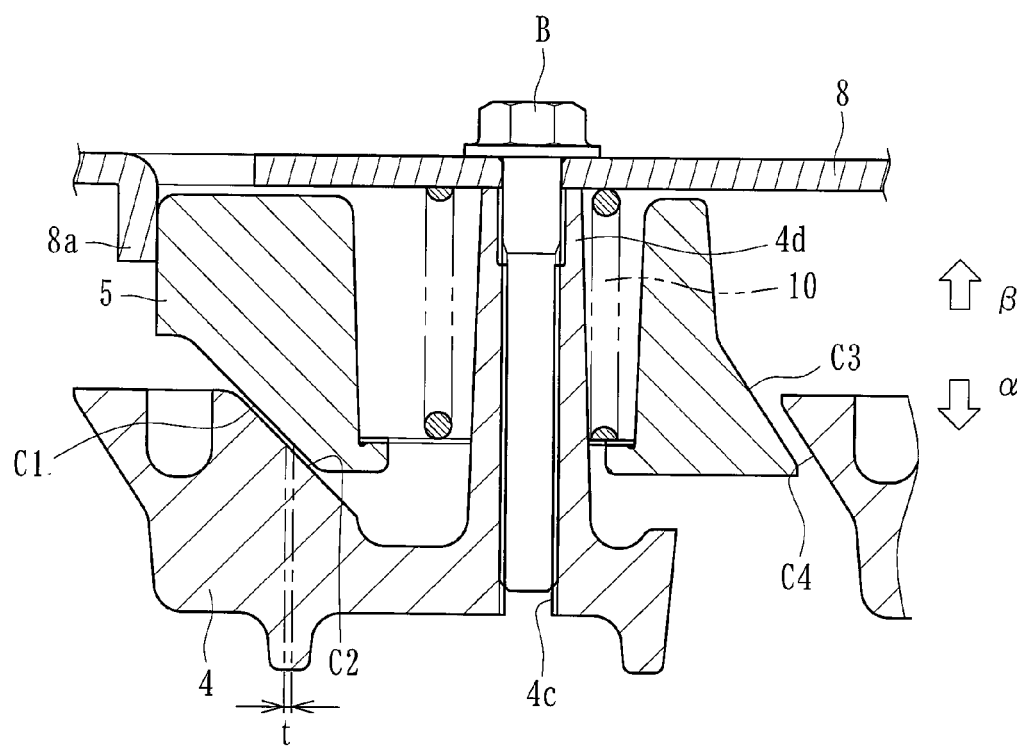

POWER TRANSMISSION DEVICE

CROSS-REFERENCE TO RELATED APPLICATIONS

This application is a continuation of International Application No. PCT/JP2019/000382, filed Jan. 9, 2019, which claims priority to Japanese Application No. 2018-002703, filed Jan. 11, 2018. The disclosures of the above applications are incorporating herein by reference.

FIELD

The present disclosure relates to a power transmission device capable of transmitting or cutting off rotational power of an input member to an output member.

BACKGROUND

In general, a motorcycle has a power transmission device that appropriately transmits or cuts off driving power of an engine to a transmission and a driving wheel. The power transmission device includes an input member, coupled to the engine side, an output member, coupled to the transmission and driving wheel side, a clutch member, coupled to an output member, and a pressure member. The pressure member presses clutch plates (drive-side clutch plates and driven-side clutch plates) against each other or releases a press-contact force. The power transmission device is configured to transmit power by pressing the drive-side clutch plates and the driven-side clutch plates against each other and to cut off power by releasing the press-contact force.

For example, in a power transmission device disclosed in WO2016/024557, a receiving member is attached to the pressure member. A clutch spring (urging member) is contained in the receiving member. It urges the pressure member in a direction such that the drive-side clutch plates and the driven-side clutch plates are pressed against each other. One cam surface is formed in the receiving member. The other cam surface, which faces the one cam surface, is formed in the clutch member. These cam surfaces constitute a back-torque limiting cam that reduces the press-contact force between the drive-side clutch plates and the driven-side clutch plates if the pressure member and the clutch member rotate relative to each other when the rotation speed of the output member exceeds the rotation speed of the input member.

That is, if the pressure member and the clutch member rotate relative to each other, when the rotation speed of the output member exceeds the rotation speed of the input member, the one cam surface and the other cam surface slide over each other and the back-torque limiting cam functions to move the receiving member in the axial direction relative to the pressure member. Thus, the urging force of the clutch spring applied to the pressure member decreases. The press-contact force between the drive-side clutch plates and the driven-side clutch plates is reduced.

However, in the existing power transmission device described above, when a driver operates a clutch lever or the like to separate the pressure member from the clutch member to disengage the clutch (release the press-contact force between the clutch plate), the pressure member may rotate relative to the clutch member. Thus, the one cam surface and the other cam surface of the torque limiter cam may make contact with each other and the receiving member may become stuck.

If the driver tries to reengage the clutch (press the clutch plates against each other again) in such a state, it may be difficult for the receiving member to return to the original position. This is due to the edge effect between the one cam surface and the other cam surface. Thus, a problem arises in that response when engaging the clutch becomes slow and the driver experiences an unpleasant sensation in operability due to the feeling of idle running. Such a problem arises not only in a device that includes the receiving member separately from the pressure member but also in a device where one cam surface is integrally formed in the pressure member.

SUMMARY

The present disclosure has been made against the background described above. The present disclosure provides a power transmission device that controls rotation of a pressure member when a driver disengages a clutch. Thus, this can improve operability and responsiveness when the driver subsequently engages the clutch.

According to the disclosure, a power transmission device includes a clutch housing that rotates together with rotation of an input member. A plurality of drive-side clutch plates are attached. A clutch member includes a plurality of driven-side clutch plates that are alternately formed with the drive-side clutch plates of the clutch housing. The plurality of driven side clutch plates is attached and coupled with an output member. A pressure member is attached to the clutch member. The pressure member is capable of pressing the drive-side clutch plates and the driven-side clutch plates against each other or releasing a press-contact force. This is in accordance with movement relative to the clutch member in an axial direction. An urging member urges the pressure member in a direction such that the drive-side clutch plates and the driven-side clutch plates are pressed against each other. An activation member is activated by an operation performed by a driver. The activation member is capable of releasing a press-contact force between the drive-side clutch plates and the driven-side clutch plates by moving the pressure member against an urging force of the urging members. A back-torque limiting cam, constituted by a pair of cam surfaces, reduce the press-contact force between the drive-side clutch plates and the driven-side clutch plates if the pressure member and the clutch member rotate relative to each other when a rotation speed of the output member exceeds a rotation speed of the input member. The power transmission device is capable of transmitting or cutting off rotational power that is input to the input member to the output member by pressing the drive-side clutch plates and the driven-side clutch plates against each other or releasing the press-contact force. The power transmission device includes a rotation restricting portion that restricts rotation, relative to the clutch member, of the pressure member that has moved due to activation of the activation member. The rotation restricting portion maintains a clearance between the pair of cam surfaces that constitute the back-torque limiting cam.

According to the disclosure, the above power transmission device includes a receiving member. The receiving member is a separate member attached to the pressure member. The receiving member receives an urging force of the urging member on the pressure member side. The receiving member transmits the urging force to the mechanism pressure member. One of the cam surfaces of the back-torque limiting cam is formed in the receiving member. The other cam surface of the back-torque limiting cam is formed in the clutch member.

According to the disclosure, the above power transmission device includes a fixing member fixed to the clutch member and attached to the urging member. The rotation restricting portion is formed in a predetermined part of the fixing member.

According to the disclosure, in the above power transmission device, the rotation restricting portion is formed in a predetermined part of the pressure member. The rotation restricting portion formed in the pressure member, that has moved due to activation of the activation member, interferes with the clutch member and restricts rotation of the pressure member.

According to the disclosure, in the above power transmission device, the rotation restricting portion is formed in a predetermined part of the clutch member. The pressure member that has moved due to activation of the activation member interferes with the rotation restricting portion formed in the clutch member. Thus, it restricts rotation of the pressure member.

The power transmission device includes the rotation restricting portion that restricts, relative to the clutch member, of the pressure member that has moved due to activation of activation member. The rotation restriction portion maintains the clearance between the pair of cam surfaces that constitute the back-torque limiting cam. This occurs by restricting rotation of the pressure member when a driver disengages the clutch. Thus, it is possible to improve operability and responsiveness when the driver subsequently engages the clutch.

The power transmission device includes the receiving member. It is a separate member attached to the pressure member. It receives an urging force of the urging member on the pressure member side. The receiving member transmits the urging force to the pressure member. The back-torque limiting cam has one cam surface formed in the receiving member. The other cam surface is formed in the clutch member. Thus, by restricting rotation of the pressure member when a driver disengages the clutch, it is possible to prevent the receiving member from becoming stuck onto the cam surface, which constitutes the back-torque limiting cam. Thus, it is possible to improve operability and responsiveness when the driver subsequently engages the clutch.

The power transmission device includes the fixing member. The fixing member is fixed to the clutch member and attached to the urging member. The rotation restricting portion is formed in a predetermined part of the fixing member. Thus, by performing replacement of the fixing member with the rotation restricting portion in an existing power transmission device, it is possible to restrict rotation of the pressure member when a driver disengages the clutch. Thus, it is possible to improve operability and responsiveness when the driver subsequently engages the clutch.

The rotation restricting portion is formed in a predetermined part of the pressure member. The rotation restricting portion formed in the pressure member, that moves due to activation of activation member, interferes with the clutch member and restricts rotation of the pressure member. Thus, by partially changing the shape of the pressure member, it is possible to restrict rotation of the pressure member when a driver disengages the clutch. Accordingly, it is possible to improve operability and responsiveness when the driver subsequently engages the clutch.

The rotation restricting portion is formed in a predetermined part of the clutch member. The pressure member, that has moved due to activation of activation member, interferes with the rotation restricting portion formed in the clutch member and restricts rotation of the pressure member. Thus, by partially changing the shape of the clutch member, it is possible to restrict rotation of the pressure member when a driver disengages the clutch. Accordingly, it is possible to improve operability and responsiveness when the driver subsequently engages the clutch.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a sectional view of a power transmission device according to a first embodiment of the disclosure.

FIG. 2 is a perspective view of the power transmission device with the clutch housing and the like removed.

FIG. 3 is a plan view of the power transmission device with the clutch housing and the like are removed.

FIG. 4 is a cross-section cutaway view taken along line IV-IV in FIG. 3.

FIG. 5 is a perspective view of a clutch member of the power transmission device.

FIG. 6 is a front plan view of the clutch member.

FIG. 7 is a rear plan view of the clutch member.

FIG. 8 is a perspective view of a pressure member of the power transmission device as seen from one side.

FIG. 9 is a perspective view of the pressure member as seen from the other side.

FIG. 10 is a back plan view of the pressure member.

FIG. 11 is a front plan view of the pressure member.

FIG. 12 is a perspective view of a receiving member of the power transmission device as seen from one side.

FIG. 13 is a perspective view of the receiving member as seen from the other side.

FIG. 14 is a front plan view and a rear plan view of the receiving member.

FIG. 15 is a cross-sectional view taken along line XV-XV in FIG. 14.

FIG. 16 is a perspective view of a fixing member of the power transmission device as seen from one side.

FIG. 17 is a perspective view of the fixing member as seen from the other side.

FIG. 18 is a cross-sectional view illustrating cam surfaces of the power transmission device (when the vehicle is accelerating and the clutch is engaged).

FIG. 19 is a cross-sectional view illustrating the cam surfaces of the power transmission device (when the vehicle is decelerating and the clutch is engaged).

FIG. 20 is a cross-sectional view illustrating the cam surfaces of the power transmission device (when the vehicle is decelerating and the clutch is disengaged).

FIG. 21 is a plan view of a power transmission device according to a second embodiment of the disclosure with a clutch housing and the like removed.

FIG. 22 is a cross-sectional view taken along line XXII-XXII in FIG. 21.

FIG. 23 is a cross-sectional view illustrating cam surfaces of the power transmission device (when the vehicle is accelerating and the clutch is engaged).

FIG. 24 is a cross-sectional view illustrating the cam surfaces of the power transmission device (when the vehicle is decelerating and the clutch is engaged).

FIG. 25 is a cross-sectional view illustrating the cam surfaces of the power transmission device (when the vehicle is decelerating and the clutch is disengaged).

FIG. 26 is front plan view of a power transmission device according to a third embodiment of the present disclosure with a clutch housing and the like removed.

FIG. 27 is a cross-sectional view taken along line XXVII-XXVII in FIG. 26.

FIG. 28 is a cross-sectional view illustrating cam surfaces of the power transmission device (when the vehicle is accelerating and the clutch is engaged).

FIG. 29 is a cross-sectional view illustrating the cam surfaces of the power transmission device (when the vehicle is decelerating and the clutch is engaged).

FIG. 30 is a cross-sectional view illustrating the cam surfaces of the power transmission device (when the vehicle is decelerating and the clutch is disengaged).

FIG. 31 is a front plan view of a power transmission device according to a fourth embodiment of the present disclosure with a clutch housing and the like removed.

FIG. 32 is a cross-sectional view taken along line XXXII-XXXII in FIG. 31.

FIG. 33 is a cross-sectional view illustrating cam surfaces of the power transmission device (when the vehicle is accelerating and the clutch is engaged).

FIG. 34 is a cross-sectional view illustrating the cam surfaces of the power transmission device (when the vehicle is decelerating and the clutch is engaged).

FIG. 35 is a cross-sectional view illustrating the cam surfaces of the power transmission device (when the vehicle is decelerating and the clutch is disengaged).

DETAILED DESCRIPTION

Hereafter, embodiments of the present disclosure will be described in detail with reference to the drawings.

A power transmission device according to the present embodiment is disposed in a vehicle, such as a motorcycle, and transmits or cuts off driving power of an engine to the transmission and driving wheel side. As illustrated in FIG. 1, the power transmission device includes a clutch housing 2, clutch member 4, pressure member 5, clutch plates 6, 7, a fixing member 8, push rod 9, clutch springs 10 and receiving members 11. The clutch housing 2 includes a gear 1 as an input member. The clutch member 4 is coupled to a shaft 3 as an output member. The pressure member 5 is formed on the right-end side of the clutch member 4 in the figure. The drive-side clutch plates 6 are coupled to the clutch housing 2 side. The driven-side clutch plates 7 are coupled to the clutch member 4 side. In the figure, the symbol S represents a damper, and the symbol D represents a ball bearing.

The gear 1 can rotate around the shaft 3 when driving power (rotational power) transmitted from the engine is input. The gear 1 is coupled to the clutch housing 2 by rivets or the like. The clutch housing 2 is a cylindrical case member whose right end side, in the figure, is open. A plurality of drive-side clutch plates 6 are attached to the inner peripheral wall of the clutch housing 2. Each of the drive-side clutch plates 6 is a substantially annular plate. Each plate 6 is fit into a spline formed in the inner peripheral surface of the clutch housing 2. The plurality of drive-side clutch plates is configured to be rotatable together with rotation of the clutch housing 2 and slidable in the axial direction (left-right directions in FIG. 1).

The clutch member 4 includes members disposed in the clutch housing 2. As illustrated in FIGS. 5 to 7, the clutch member 4 includes a central hole 4a, outer peripheral wall 4b, bolt holes 4c and boss portions 4d. The shaft 3 is inserted into the central hole 4a. The outer peripheral wall 4b includes splines. The bolt holes 4c receive bolts B. The boss portions 4d includes the bolt holes 4c. Splines are formed in each of the inner peripheral surface of the central hole 4a and the outer peripheral surface of the shaft 3. The shaft 3 is spline-fit and coupled to the central hole 4a. Thus, the shaft 3 rotates when the clutch member 4 rotates. The driven-side clutch plates 7 are fit and attached to the splines formed in the outer peripheral wall 4b.

To be more specific, the splines, formed in the outer peripheral wall 4b of the clutch member 4, are composed of protrusions and recesses. They are integrally formed around substantially the entire periphery of the outer peripheral wall 4b. The driven-side clutch plates 7 engage with recessed grooves of the splines. Thus, movement of the driven-side clutch plates 7, in the rotational direction, is restricted while movement of the driven-side clutch plates 7. relative to the clutch member 4 in the axial direction, is allowed. The driven-side clutch plates 7 rotate together with the clutch member 4.

The driven-side clutch plates 7 are stacked alternately with the drive-side clutch plates 6. The drive-side clutch plates 6 and the driven-side clutch plates 7, adjacent to each other, can be pressed against each other or the press-contact force can be released. That is, the drive-side clutch plates 6 and the driven-side clutch plates 7 are allowed to slide in the axial direction of the clutch member 4. The drive-side clutch plates 6 and the driven-side clutch plates 7 are pressed against each other when pressed by the pressure member 5 in the leftward direction in FIG. 1. Thus, the rotational power of the clutch housing 2 can be transmitted to the shaft 3, via the clutch member 4. When pressing by the pressure member 5 is relieved, the press-contact force is released. The clutch member 4 stops following the rotation of the clutch housing 2 and stops. Thus, rotational power is not transmitted to the shaft 3.

Moreover, as illustrated in FIGS. 2 to 4, the fixing member 8 is fixed to the tip-end side of the boss portions 4d by the bolts B. The bolts B are inserted through the bolt holes 4c. The clutch springs 10, as an urging member, are attached to the fixing member 8. To be specific, the fixing member 8 is an annular metal member. The fixing member 8 is fixed to the tip ends of the boss portions 4d by the bolts B. It is mounted in such a way that the receiving members 11 are positioned between the bolts B. The other end portions of the clutch springs 10 are in contact with the receiving members 11.

Each of the clutch springs 10 is a coil spring. Each spring 10 is mounted so that, in a state of being contained in the receiving member 11, one end is in contact with the bottom surface side of the receiving member 11. Specifically, a receiving portion 11b receives the springs 10 and is described below. The other end of the spring 10 is in contact with the fixing member 8. The clutch springs 10 constantly urge the pressure member 5 in a direction so that the drive-side clutch plates 6 and the driven-side clutch plates 7 are pressed against each other. They are pressed in a direction so that the pressure member 5 becomes closer to the clutch member 4. Another urging member may be used as the clutch spring 10.

The pressure member 5 is attached to the clutch member 4 at a position on the right end side in FIG. 1. The pressure member 5 is movable in the axial direction of the clutch member 4 (left-right directions in FIG. 1). The pressure member 5 can press the drive-side clutch plates 6 and the driven-side clutch plates 7 against each other or release the press-contact force. This is in accordance with movement relative to the clutch member 4 in the axial direction. To be more specific, as illustrated in FIGS. 8 to 11, the pressure member 5 includes a flange portion 5a. The flange portion 5a presses the drive-side clutch plates 6 and the driven-side clutch plates 7 against each other. Attachment holes 5b attach the receiving members 11. Through-holes 5c and a central hole 5d are in the pressure member 5.

A pressed member E is attached, via the ball bearing D, to the central hole 5d of the pressure member 5, as illustrated in FIG. 1. The pressed member E is attached to the tip end side of the shaft 3. It is movable so as to follow the push rod 9. When a driver operates an operation mechanism, such as a clutch lever or the like (not shown), to cause the push rod 9 to protrude in the rightward direction in the figure, the pressed member E moves in the same direction. Thus, the pressure member 5 can be moved in the rightward direction in FIG. 1, away from the clutch member 4, against the urging forces of the clutch springs 10.

When the pressure member 5 moves in the rightward direction, the press-contact force between the drive-side clutch plates 6 and the driven-side clutch plates 7 is released. Thus, rotational power input to the gear 1 and the clutch housing 2 is cut off and not transmitted to the clutch member 4 and the shaft 3 (clutch is disengaged). When the driver stops operating the operation mechanism the pressure member 5 moves in the leftward direction in FIG. 1, due to the urging forces of the clutch springs 10, and the drive-side clutch plates 6 and the driven-side clutch plates 7 are pressed against each other. Thus, rotational power input to the gear 1 and the clutch housing 2 is transmitted to the clutch member 4 and the shaft 3. The clutch is engaged.

The pressure member 5 is configured to press the drive-side clutch plates 6 and the driven-side clutch plates 7 against each other or release the press-contact force. This occurs in accordance with movement relative to the clutch member 4 in the axial direction. The push rod 9 and the pressed member E, which are activated by an operation performed by a driver, can release the press-contact force between the drive-side clutch plates 6 and the driven-side clutch plates 7. This occurs by moving the pressure member 5 against the urging force of the clutch spring 10 (urging member) as described above. This constitutes an "activation member" of the present disclosure.

The attachment holes 5b are formed in the pressure member 5 at a plurality of (three) positions on the same circle at regular intervals. The receiving members 11 are attached to each of the attachment holes 5b. The receiving members 11, attached to the attachment hole 5b of the pressure member 5, make contact with one end of the clutch spring 10 and receive the urging force. The receiving member 11 is separate from the pressure member 5. As illustrated in FIGS. 12 to 15, the receiving member 11, according to the present embodiment, is a cup-shaped member. It includes a recessed portion 11a, a receiving portion 11b and a flange portion 11c. The recessed portion 11a contains the clutch spring 10. The receiving portion 11b is formed in the recessed portion 11a and makes contact with one end portion of the clutch spring 10. Thus, it receives the urging force. The flange portion 11c contacts the pressure member 5. The flange portion 11c transmits the urging force of the clutch spring 10 to the pressure member 5.

The flange portion 11c is formed on the opening side of the receiving member 11. When the receiving member 11 is attached to the attachment hole 5b, the flange portion 11c makes contact with the opening edge of the attachment hole 5b. The receiving member 11 is attached to the attachment hole 5b. The clutch spring 10 is mounted into the recessed portion 11a so that one end portion contact the receiving portion 11b. The urging force of the clutch spring 10 is transmitted to the pressure member 5 side via the flange portion 11c of the receiving members 11. The drive-side clutch plates 6 and the driven-side clutch plates 7 can be pressed against each other by using the transmitted urging force.

The power transmission device includes a press-contact assisting cam. The cam can increase the press-contact force between the drive-side clutch plates 6 and the driven-side clutch plates 7 if the pressure member 5 and the clutch member 4 rotate relative to each other when rotational power input to the gear 1, as an input member, becomes capable of being transmitted to the shaft 3 as an output member. A back-torque limiting cam reduces the press-contact force between the drive-side clutch plates 6 and the driven-side clutch plates 7 if the pressure member 5 and the clutch member 4 rotate relative to each other when the rotation speed of the shaft 3, as an output member, exceeds the rotation speed of the gear 1, as an input member. Cam surfaces (first to sixth cam surfaces C1 to C6) constitute the press-contact assisting cam and the back-torque limiting cam. They are shown by shading (cross-hatching) in the figures.

As illustrated in FIGS. 4 and 18, the press-contact assisting cam, according to the present embodiment, is configured by the third cam surfaces C3 and the fourth cam surfaces C4. The third C3 and fourth C4 cam surfaces are respectively formed in the pressure member 5 and the clutch member 4 facing each other. When assembling the clutch member 4 and the pressure member 5 together, the third cam surfaces C3 (see FIG. 11), formed in the pressure member 5, and the fourth cam surfaces C4 (see FIG. 7), formed in the clutch member 4, are disposed to face each other. Thus, if the pressure member 5 and the clutch member 4 rotate relative to each other, when rotational power input to the gear 1 becomes capable of being transmitted to the shaft 3, the pressure member 5 is moved in the direction α in FIG. 18 by the cam function of the third cam surfaces C3 and the fourth cam surfaces C4. Thus, the pressure member 5 becomes closer to the clutch member 4. Thus, the press-contact force between the drive-side clutch plates 6 and the driven-side clutch plates 7 is increased.

As illustrated in FIGS. 4 and 19, the back-torque limiting cam, according to the present embodiment, is configured by the first cam surfaces C1 and the second cam surfaces C2. The first C1 and second C2 cam surfaces are respectively formed in the receiving members 11 and the clutch member 4 facing each other. When assembling the clutch member 4, the pressure member 5, and the receiving members 11 together, the first cam surfaces C1 (see FIGS. 13 and 14), formed in the bottom side surfaces of the receiving members 11, and the second cam surfaces C2 (see FIG. 6), formed in the clutch member 4, are disposed to face each other. Thus, if the pressure member 5 and the clutch member 4 rotate relative to each other, when the rotation speed of the shaft 3 exceeds the rotation speed of the gear 1, the receiving members 11 are moved in the direction β in FIG. 19 by the cam function of the first cam surfaces C1 and the second cam surfaces C2. This reduces the urging force of the clutch springs 10 transmitted to the pressure member 5. Thus, the press-contact force between the drive-side clutch plates 6 and the driven-side clutch plates 7 is reduced. Reduction of the press-contact force refers to a state where rotational-power transmitting capacity is reduced due to sliding of the drive-side clutch plates 6 and the driven-side clutch plates 7 over each other.

As illustrated in FIG. 14, in each of the receiving members 11, according to the present embodiment, the fifth cam surface C5 is formed on a side opposite from the first cam surface C1. The sixth cam surfaces C6 (see FIG. 11), each of which faces the fifth cam surface C5, is formed in the pressure member 5. That is, in both side surfaces of the bottom portion of each of the receiving members 11, the first cam surface C1 and the fifth cam surface C5 are respectively formed. The back-torque limiting cam is constituted by the first cam surfaces C1, the second cam surfaces C2, the fifth cam surfaces C5, and the sixth cam surfaces C6.

When assembling the clutch member 4, the pressure member 5, and the receiving members 11 together, the first cam surfaces C1, formed in the receiving members 11, and the second cam surfaces C2, formed in the clutch member 4, are disposed to face each other. Also, the fifth cam surfaces C5, formed in the receiving members 11, and the sixth cam surfaces C6, formed in the pressure member 5, are disposed to face each other. Thus, if the pressure member 5 and the clutch member 4 rotate relative to each other, when the rotation speed of the shaft 3 exceeds the rotation speed of the gear 1, the receiving members 11 are moved in the direction β in FIG. 19 by the cam function of the first cam surfaces C1 and the second cam surfaces C2 and the cam function of the fifth cam surfaces C5 and the sixth cam surfaces C6. Thus, the press-contact force between the drive-side clutch plates 6 and the driven-side clutch plates 7 is reduced.

When the back-torque limiting cam functions, the receiving members 11 receive both of the cam function of the first cam surfaces C1 and the second cam surfaces C2 and the cam function of the fifth cam surfaces C5 and the sixth cam surfaces C6. Although the back-torque limiting cam, according to the present embodiment, includes the fifth cam surfaces C5 and the sixth cam surfaces C6, in addition to the first cam surfaces C1 and the second cam surfaces C2, the back-torque limiting cam may have only the first cam surfaces C1 and the second cam surfaces C2.

The power transmission device, according to the present embodiment, includes a rotation restricting portion 8a. It restricts rotation, relative to the clutch member 4, of the pressure member 5 that has moved due to activation of the push rod 9 and the pressed member E (activation member). Also, it maintains the clearance t (see FIG. 20) between a pair of cam surfaces (the first cam surface C1 and the second cam surface C2) that constitute a back-torque limiting cam. To be specific, as illustrated in FIGS. 16 and 17, the rotation restricting portion 8a, according to the present embodiment, is formed by bending a predetermined part of the fixing member 8.

When the push rod 9 and the pressed member E (activation member) are activated, the pressure member 5 moves. The press-contact force between the drive-side clutch plates 6 and the driven-side clutch plates 7 is released (the clutch is disengaged). Then, as illustrated in FIG. 20, the pressure member 5 interferes with the rotation restricting portion 8a and movement of the pressure member 5 in the direction is restricted. The clearance t between the first cam surface C1 and the second cam surface C2, that constitutes the back-torque limiting cam, is maintained. Thus, the rotation restricting portion 8a prevents the pressure member 5 from rotating and the receiving member 11 from becoming stuck onto the second cam surface C2 when the activation member (the push rod 9 and the pressed member E) is activated.

The present embodiment includes the rotation restricting portion 8a restricting rotation, relative to the clutch member 4, (rotation in a direction so that the first cam surface C1 and the second cam surface C2 become closer to each other) of the pressure member 5 that has moved due to activation of activation member (the push rod 9 and the pressed member E). It maintains the clearance between the pair of cam surfaces, the first cam surface C1 and the second cam surface C2), that constitute the back-torque limiting cam. Therefore, with the present embodiment, by restricting rotation of the pressure member 5, when a driver disengages the clutch, it is possible to improve operability and responsiveness when the driver subsequently engages the clutch.

The present embodiment includes the receiving member 11 that is a separate member attached to the pressure member 5. The receiving member 11 receives an urging force of the clutch spring 10 (urging member) on the pressure member 5 side. The receiving member 11 transmits the urging force to the pressure member 5. The back-torque limiting cam has the first cam surface C1, which is one cam surface, formed in the receiving member 11. The second cam surface C2, which is the other cam surface, is formed in the clutch member 4. Therefore, with the present embodiment, by restricting rotation of the pressure member 5 when a driver disengages the clutch, it is possible to prevent the receiving member 11 from becoming stuck onto the second cam surface C2, that constitutes the back-torque limiting cam. Accordingly, it is possible to improve operability and responsiveness when the driver subsequently engages the clutch.

The rotation restricting portion 8a, according to the present embodiment, is formed in a predetermined part of the fixing member 8. In particular, it is integrally formed by bending a predetermined part of the fixing member 8. Therefore, by replacing the fixing member 8, with the rotation restricting portion 8a, in an existing power transmission device, it is possible to restrict rotation of the pressure member 5 when a driver disengages the clutch. Thus, it is possible to improve operability and responsiveness when the driver subsequently engages the clutch.

A power transmission device according to a second embodiment of the present disclosure will be described.

As with the first embodiment, a power transmission device according to the present embodiment is disposed in a vehicle, such as a motorcycle. It transmits or cuts off driving power of an engine to the transmission and driving wheel side. The power transmission device includes a clutch housing 2 with a gear 1 as an input member, a clutch member 4 coupled to a shaft 3 as an output member, a pressure member 5 formed on the right-end side of the clutch member 4, drive-side clutch plates 6 coupled to the clutch housing 2 side, driven-side clutch plates 7 coupled to the clutch member 4 side, a fixing member 8, a push rod 9, clutch springs 10 as urging members, and receiving members 11. Elements that are the same as those of the first embodiment will be denoted by the same numerals, and detailed descriptions of such elements will be omitted.

The press-contact assisting cam according to the present embodiment is configured as follows. When assembling the clutch member 4 and the pressure member 5 together, the third cam surfaces C3, formed in the pressure member 5, and the fourth cam surfaces C4, formed in the clutch member 4, are disposed to face each other. Thus, if the pressure member 5 and the clutch member 4 rotate relative to each other, when rotational power input to the gear 1 is transmitted to the shaft 3, the pressure member 5 is moved in the direction α in FIG. 23 by the cam function of the third cam surfaces C3 and the fourth cam surfaces C4. Thus, the pressure member 5 becomes closer to the clutch member 4. The press-contact force between the drive-side clutch plates 6 and the driven-side clutch plates 7 is increased.

The back-torque limiting cam, according to the present embodiment, is configured as follows. When assembling the clutch member 4, the pressure member 5, and the receiving members 11 together, the first cam surfaces C1, formed in the bottom side surfaces of the receiving members 11, and the second cam surfaces C2, formed in the clutch member 4, are disposed to face each other. Thus, if the pressure member 5 and the clutch member 4 rotate relative to each other, when the rotation speed of the shaft 3 exceeds the rotation speed of the gear 1, the receiving members 11 are moved in the direction β in FIG. 24 by the cam function of the first cam surfaces C1 and the second cam surfaces C2. This reduces the urging force of the clutch springs 10 transmitted to the pressure member 5. The press-contact force between the drive-side clutch plates 6 and the driven-side clutch plates 7 is reduced.

As illustrated in FIGS. 21 and 22, a rotation restricting portion 5e is integrally formed in a predetermined part of the pressure member 5. The rotation restricting portion 5e restricts rotation, relative to the clutch member 4, of the pressure member 5 that has moved due to activation of the push rod 9 and the pressed member E (activation member). The rotation restricting portion 5e maintains the clearance t (see FIG. 25) between a pair of cam surfaces (the first cam surface C1 and the second cam surface C2) that constitute the back-torque limiting cam. As illustrated in FIG. 22, the rotation restricting portion 5e is formed by a predetermined part of the pressure member 5 protruding in the rotation direction of the pressure member 5.

When the push rod 9 and the pressed member E (activation member) are activated, the pressure member 5 moves, and the press-contact force between the drive-side clutch plates 6 and the driven-side clutch plates 7 is released (the clutch is disengaged). As illustrated in FIG. 25, the rotation restricting portion 5e, formed in the pressure member 5, interferes with the boss portion 4d of the clutch member 4. Movement of the pressure member 5 in this direction is restricted. The clearance t between the first cam surface C1 and the second cam surface C2, which constitute the back-torque limiting cam, is maintained. Thus, the rotation restricting portion 5e prevents the pressure member 5 from rotating and the receiving member 11 from becoming stuck onto the second cam surface C2 when the activation member (the push rod 9 and the pressed member E) is activated. A part that interferes with the rotation restricting portion 5e is not limited to the boss portion 4d of the clutch member 4. It may be another part including a separately and newly formed part.

The present embodiment includes the rotation restricting portion 5e. It restricts rotation, relative to the clutch member 4, (rotation in a direction such that the first cam surface C1 and the second cam surface C2 become closer to each other) of the pressure member 5 that has moved due to activation of activation member (the push rod 9 and the pressed member E). The rotation restricting portion 5e maintains the clearance between the pair of cam surfaces, the first cam surface C1 and the second cam surface C2, that constitute the back-torque limiting cam. Therefore, with the present embodiment, by restricting rotation of the pressure member 5 when a driver disengages the clutch, it is possible to improve operability and responsiveness when the driver subsequently engages the clutch.

The present embodiment includes the receiving member 11 that is a separate member attached to the pressure member 5. The receiving member 11 receives an urging force of the clutch spring 10 (urging member) on the pressure member 5 side. It transmits the urging force to the pressure member 5. The back-torque limiting cam includes the first cam surface C1, which is one cam surface, formed in the receiving member 11. The second cam surface C2, which is the other cam surface, is formed in the clutch member 4. Therefore, with the present embodiment, by restricting rotation of the pressure member 5 when a driver disengages the clutch, it is possible to prevent the receiving member 11 from becoming stuck onto the second cam surface C2, which constitutes the back-torque limiting cam. Thus, it is possible to improve operability and responsiveness when the driver subsequently engages the clutch.

Furthermore, the rotation restricting portion 5e, according to the present embodiment, is formed in a predetermined part of the pressure member 5. The rotation restricting portion 5e, formed in the pressure member 5 that has moved due to activation of activation member (the push rod 9 and the pressed member E), interferes with the boss portion 4d of the clutch member 4 and restricts rotation of the pressure member 5. Therefore, by partially changing the shape of the pressure member 5, it is possible to restrict rotation of the pressure member 5 when a driver disengages the clutch. Thus, it is possible to improve operability and responsiveness when the driver subsequently engages the clutch.

Next, a power transmission device according to a third embodiment of the present disclosure will be described.

As with the first embodiment, a power transmission device according to the present embodiment is disposed in a vehicle, such as a motorcycle. It appropriately transmits or cuts off driving power of an engine to the transmission and driving wheel side. The power transmission device includes a clutch housing 2 with a gear 1 as an input member, a clutch member 4 coupled to a shaft 3 as an output member, a pressure member 5 formed on the right-end side of the clutch member 4, drive-side clutch plates 6 coupled to the clutch housing 2 side, driven-side clutch plates 7 coupled to the clutch member 4 side, a fixing member 8, a push rod 9, clutch springs 10 as urging member, and receiving members 11. Elements that are the same as those of the first embodiment will be denoted by the same numerals, and detailed descriptions of such elements will be omitted.

The press-contact assisting cam according to the present embodiment is configured as follows. When assembling the clutch member 4 and the pressure member 5 together, the third cam surfaces C3, formed in the pressure member 5, and the fourth cam surfaces C4, formed in the clutch member 4, are disposed to face each other. Thus, if the pressure member 5 and the clutch member 4 rotate relative to each other, when rotational power input to the gear 1 is transmitted to the shaft 3, the pressure member 5 is moved in the direction α in FIG. 28 by the cam function of the third cam surfaces C3 and the fourth cam surfaces C4. Thus, the pressure member 5 becomes closer to the clutch member 4. The press-contact force between the drive-side clutch plates 6 and the driven-side clutch plates 7 is increased.

The back-torque limiting cam according to the present embodiment is configured as follows. When assembling the clutch member 4, the pressure member 5, and the receiving members 11 together, the first cam surfaces C1, formed in the bottom side surfaces of the receiving members 11, and the second cam surfaces C2, formed in the clutch member 4, are disposed to face each other. Thus, if the pressure member 5 and the clutch member 4 rotate relative to each other, when the rotation speed of the shaft 3 exceeds the rotation speed of the gear 1, the receiving members 11 are moved in the direction β in FIG. 29 by the cam function of the first cam surfaces C1 and the second cam surfaces C2. This reduces the urging force of the clutch springs 10 transmitted to the pressure member 5. The press-contact force between the drive-side clutch plates 6 and the driven-side clutch plates 7 is reduced.

As illustrated in FIGS. 26 and 27, a rotation restricting portion 4e is integrally formed in a predetermined part of the clutch member 4. The rotation restricting portion 4e is capable of restricting rotation, relative to the clutch member 4, of the pressure member 5 that has moved due to activation of the push rod 9 and the pressed member E (activation member). The rotation restriction portion 4e maintains the clearance t (see FIG. 30) between a pair of cam surfaces, the first cam surface C1 and the second cam surface C2, that constitute the back-torque limiting cam. As illustrated in FIG. 27, the rotation restricting portion 4e is formed by a predetermined part of the clutch member 4. A predetermined part of the boss portion 4d, in the present embodiment, protrudes in the rotation direction of the pressure member 5.

When the push rod 9 and the pressed member E (activation member) are activated, the pressure member 5 moves. The press-contact force between the drive-side clutch plates 6 and the driven-side clutch plates 7 is released (the clutch is disengaged). As illustrated in FIG. 30, the pressure member 5 interferes with the rotation restricting portion 4e, formed in the clutch member 4, and movement of the pressure member 5 in this direction is restricted. The clearance t between the first cam surface C1 and the second cam surface C2, which constitute the back-torque limiting cam, is maintained. Thus, the rotation restricting portion 4e prevents the pressure member 5 from rotating and the receiving member 11 from becoming stuck onto the second cam surface C2 when the activation member (the push rod 9 and the pressed member E) are activated. A part that interferes with the rotation restricting portion 4e may be a separate and newly formed part of the pressure member 5.

The present embodiment includes the rotation restricting portion 4e that restricts rotation, relative to the clutch member 4, (rotation in a direction such that the first cam surface C1 and the second cam surface C2 become closer to each other) of the pressure member 5 that has moved due to activation of activation member (the push rod 9 and the pressed member E). It maintains the clearance between the pair of cam surfaces, the first cam surface C1 and the second cam surface C2, that constitute the back-torque limiting cam. Therefore, with the present embodiment, by restricting rotation of the pressure member 5, when a driver disengages the clutch, it is possible to improve operability and responsiveness when the driver subsequently engages the clutch.

The present embodiment includes the receiving member 11 that is a separate member attached to the pressure member 5. The receiving member 11 receives an urging force of the clutch spring 10 (urging member) on the pressure member 5 side. The receiving member 11 transmits the urging force to the pressure member 5. The back-torque limiting cam has the first cam surface C1, which is one cam surface, formed in the receiving member 11. The second cam surface C2, which is the other cam surface, is formed in the clutch member 4. Therefore, with the present embodiment, by restricting rotation of the pressure member 5 when a driver disengages the clutch, it is possible to prevent the receiving member 11 from becoming stuck onto the second cam surface C2, which constitutes the back-torque limiting cam. Thus, it is possible to improve operability and responsiveness when the driver subsequently engages the clutch.

The rotation restricting portion 4e, according to the present embodiment, is formed in a predetermined part of the clutch member 4. The pressure member 5, that moves due to activation of activation member (the push rod 9 and the pressed member E), interferes with the rotation restricting portion 4e formed in the clutch member 4. This restricts rotation of the pressure member 5. Therefore, by partially changing the shape of the clutch member 4, it is possible to restrict rotation of the pressure member 5 when a driver disengages the clutch. Thus, it is possible to improve operability and responsiveness when the driver subsequently engages the clutch.

Next, a power transmission device according to a fourth embodiment of the present disclosure will be described.

As with the first embodiment, a power transmission device, according to the present embodiment, is disposed in a vehicle, such as a motorcycle. It appropriately transmits or cuts off driving power of an engine to the transmission and driving wheel side. The power transmission device includes a clutch housing 2 with a gear 1 as an input member, a clutch member 4 coupled to a shaft 3 as an output member, a pressure member 5 formed on the right-end side of the clutch member 4, drive-side clutch plates 6 coupled to the clutch housing 2 side, driven-side clutch plates 7 coupled to the clutch member 4 side, a fixing member 8, a push rod 9, and clutch springs 10 as an urging member. Elements that are the same as those of the first embodiment will be denoted by the same numerals. Their detailed descriptions of such elements will be omitted. However, the power transmission device according to the present embodiment does not have the receiving members 11 included in the first to third embodiments.

The press-contact assisting cam according to the present embodiment is configured as follows. When assembling the clutch member 4 and the pressure member 5 together, the third cam surfaces C3, formed in the pressure member 5, and the fourth cam surfaces C4, formed in the clutch member 4, are disposed to face each other. Thus, if the pressure member 5 and the clutch member 4 rotate relative to each other, when rotational power input to the gear 1 is transmitted to the shaft 3, the pressure member 5 is moved in the direction α in FIG. 33 by the cam function of the third cam surfaces C3 and the fourth cam surfaces C4. Thus, the pressure member 5 becomes closer to the clutch member 4. The press-contact force between the drive-side clutch plates 6 and the driven-side clutch plates 7 is increased.

The back-torque limiting cam according to the present embodiment is configured as follows. When assembling the clutch member 4 and the pressure member 5 together, the first cam surfaces C1, formed in the pressure member 5, and the second cam surfaces C2, formed in the clutch member 4, are disposed to face each other. Thus, if the pressure member 5 and the clutch member 4 rotate relative to each other, when the rotation speed of the shaft 3 exceeds the rotation speed of the gear 1, the pressure member 5 is moved in the direction β in FIG. 34 by the cam function of the first cam surfaces C1 and the second cam surfaces C2. The press-contact force between the drive-side clutch plates 6 and the driven-side clutch plates 7 is reduced.

As illustrated in FIGS. 16 and 17, a rotation restricting portion 8a is integrally formed in a predetermined part of the fixing member 8. The rotation restricting portion 8a restricts rotation, relative to the clutch member 4, of the pressure member 5 that has moved due to activation of the push rod 9 and the pressed member E (activation member). The rotation restricting portion 8a maintains the clearance t (see FIG. 35) between a pair of cam surfaces, the first cam surface C1 and the second cam surface C2, that constitute the back-torque limiting cam. As illustrated in FIG. 32, the rotation restricting portion 8a is formed by bending a predetermined part of the fixing member 8.

That is, when the push rod 9 and the pressed member E (activation member) are activated, the pressure member 5 moves. The press-contact force between the drive-side clutch plates 6 and the driven-side clutch plates 7 is released (the clutch is disengaged). As illustrated in FIG. 35, the pressure member 5 interferes with the rotation restricting portion 8a. The movement of the pressure member 5 in this direction is restricted. The clearance t between the first cam surface C1 and the second cam surface C2, which constitute the back-torque limiting cam, is maintained. Thus, the rotation restricting portion 8a prevents the pressure member 5 from rotating and the first cam surface C1 from becoming stuck onto the second cam surface C2 when the activation member (the push rod 9 and the pressed member E) is activated.

The present embodiment includes the rotation restricting portion 8a that restricts rotation, relative to the clutch member 4, (rotation in a direction such that the first cam surface C1 and the second cam surface C2 become closer to each other) of the pressure member 5 that has moved due to activation of activation member (the push rod 9 and the pressed member E). It maintains the clearance between the pair of cam surface, the first cam surface C1 and the second cam surface C2, that constitute the back-torque limiting cam. Therefore, with the present embodiment, by restricting rotation of the pressure member 5, when a driver disengages the clutch, it is possible to improve operability and responsiveness when the driver subsequently engages the clutch.

The rotation restricting portion 8a, according to the present embodiment, is formed in a predetermined part of the fixing member 8. In particular, it is integrally formed by bending a predetermined part of the fixing member 8. Therefore, by replacing the fixing member 8, with the rotation restricting portion 8a, in an existing power transmission device, it is possible to restrict rotation of the pressure member 5 when a driver disengages the clutch. Thus, it is possible to improve operability and responsiveness when the driver subsequently engages the clutch.

The present disclosure is not limited to the embodiments described above. For example, the present disclosure may be applied to a power transmission device that does not have the press-contact assisting cam (the third cam surface C3 and the fourth cam surface C4). Even in this case, the power transmission device includes the rotation restricting portion (8a, 4e, 5e) that restricts rotation, relative to the clutch member 4 (rotation in a direction such that the first cam surface C1 and the second cam surface C2 become closer to each other) of the pressure member 5 that has moved due to activation of activation member (the push rod 9 and the pressed member E). It maintains the clearance between the pair of cam surfaces, the first cam surface C1 and the second cam surface C2, that constitute the back-torque limiting cam. Thus, by restricting rotation of the pressure member 5, when a driver disengages the clutch, it is possible to improve operability and responsiveness when the driver subsequently engages the clutch.

The number of attached receiving members 11 and the shape of each of the receiving members 11 are not limited. The present disclosure is applicable to a power transmission device that does not have a receiving member 11 as in the fourth embodiment. The power transmission device according to the present disclosure can be used as a multiple disc clutch for a motorcycle, an automobile, a three-wheeled or four-wheeled ATV, a general-purpose machine, or the like.

The present disclosure is applicable to any power transmission device that has a different outer shape or that has additional functions. This is as long as the power transmission device has a rotation restricting portion that restricts rotation, relative to a clutch member, of a pressure member that has moved due to activation of activation member. It maintains clearance between a pair of cam surfaces that constitute a back-torque limiting cam.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A power transmission device comprising:
a clutch housing that rotates together with rotation of an input member and a plurality of drive-side clutch plates attached to the clutch housing;
a clutch member with a plurality of driven-side clutch plates that are alternately positioned with the drive-side clutch plates of the clutch housing, an output member is coupled with the clutch member;
a pressure member attached to the clutch member, the pressure member pressing the drive-side clutch plates and the driven-side clutch plates against each other or releasing a press-contact force in accordance with movement relative to the clutch member in an axial direction;
urging member that urges the pressure member in a direction such that the drive-side clutch plates and the driven-side clutch plates are pressed against each other;
activation member activated by an operation performed by a driver, the activation member releasing a press-contact force between the drive-side clutch plates and the driven-side clutch plates by moving the pressure member against an urging force of the urging means;
a back-torque limiting cam including a pair of cam surfaces that reduce the press-contact force between the drive-side clutch plates and the driven-side clutch plates if the pressure member and the clutch member rotate relative to each other when a rotation speed of the output member exceeds a rotation speed of the input member;
the power transmission device transmitting or cutting off rotational power that is input to the input member to the output member by pressing the drive-side clutch plates and the driven-side clutch plates against each other or releasing the press-contact force; and
the power transmission device includes a rotation restriction portion positioned between a clutch boss and the pressure member, the rotation restricting portion restricting rotation, relative to the clutch member, of the pressure member that has moved due to activation of the activation member and the rotation restricting portion maintaining a clearance between the pair of cam surfaces, that constitute the back-torque limiting cam; a fixing member fixed to the clutch member and attached with the urging member, wherein the rotation restricting portion is formed with the fixing member.

2. The power transmission device according to claim 1, further comprising a receiving member that is a separate member attached to the pressure member, the receiving member receives the urging force of the urging member on the pressure member side, and the receiving member transmitting the urging force to the pressure member, wherein one of the cam surfaces of the back-torque limiting cam is formed in the receiving member, and the other cam surface of the back-torque limiting cam is formed in the clutch member.

* * * * *